United States Patent
Roe

[19]

[11] Patent Number: 5,980,615
[45] Date of Patent: Nov. 9, 1999

[54] COMPACT AIR DRYER

[76] Inventor: Robert J. Roe, #216 - 8975 Jones Rd., Richmond, B.C., Canada, V6Y 3Y7

[21] Appl. No.: 09/010,552

[22] Filed: Jan. 22, 1998

[51] Int. Cl.$^6$ ............................. B01D 53/04; B01D 53/26
[52] U.S. Cl. ................................ 96/111; 96/112; 96/115; 96/124; 96/128; 96/130; 96/144; 96/146
[58] Field of Search ............................. 96/109–117, 121, 96/122, 124–128, 130, 139–141, 144, 143, 146

[56] References Cited

U.S. PATENT DOCUMENTS

| | | |
|---|---|---|
| 2,204,431 | 6/1940 | Moore . |
| 2,219,547 | 10/1940 | Locke ........................................ 96/109 |
| 2,248,225 | 7/1941 | Fonda ........................................ 96/111 |
| 2,344,384 | 3/1944 | Altenkirch ............................ 96/124 X |
| 2,440,326 | 4/1948 | Cadman . |
| 2,501,280 | 3/1950 | Kemp . |
| 2,511,666 | 6/1950 | Barr . |
| 2,561,441 | 7/1951 | Lou . |
| 2,680,492 | 6/1954 | Kopp ........................................ 96/125 |
| 3,192,686 | 7/1965 | Berkey . |
| 3,224,168 | 12/1965 | Gregory . |
| 3,368,327 | 2/1968 | Munters et al. ........................ 96/127 X |
| 3,594,990 | 7/1971 | Hawley . |
| 3,619,987 | 11/1971 | Colvin et al. ............................. 96/111 |
| 4,062,129 | 12/1977 | Yoshida et al. ........................ 96/125 X |
| 4,385,913 | 5/1983 | Lane . |
| 4,497,361 | 2/1985 | Hajicek ........................................ 96/125 |
| 4,536,198 | 8/1985 | Strain ..................................... 96/126 X |
| 4,589,892 | 5/1986 | Leonard ...................................... 96/115 |
| 4,668,249 | 5/1987 | Purdue . |
| 4,699,635 | 10/1987 | Norback . |
| 4,846,211 | 7/1989 | Scheffler . |

(List continued on next page.)

FOREIGN PATENT DOCUMENTS

| | | |
|---|---|---|
| 0 279 495 | 8/1988 | European Pat. Off. . |
| 0 360 752 | 3/1990 | European Pat. Off. . |
| 5-200236 | 8/1993 | Japan ........................................ 96/112 |
| 6-047239 | 2/1994 | Japan ........................................ 96/125 |
| 0918696 | 4/1982 | U.S.S.R. ................................... 96/121 |

OTHER PUBLICATIONS

Airflow Company product literature regarding Dryomatic®, model 25 CT Dehumidifier.
Airflow Company product literature regarding Dryomatic®, model R–series Dehumidifier.
Airflow Company product literature regarding Dryomatic®, model RC–500 Dehumidifier.
Airflow Company product literature.
Munters Cargocaire product literature.

*Primary Examiner*—Robert Spitzer
*Attorney, Agent, or Firm*—Barrigar & Moss; Robert H. Barrigar

[57] ABSTRACT

A compact desiccant-operated air dryer includes air directing housings, each housing including a separate desiccant bed. Each housing includes an associated desiccant bed to provide dehumidification to process air flow during a dehumidification phase of the housing; during operation, at least one desiccant housing will be in the dehumidification phase so as to provide continuous dehumidification. The associated desiccant bed for a desiccant housing is reactivated during the reactivation phase of the desiccant housing. Each desiccant housing extends between two external chambers at each end; a process inlet chamber and reactivation outlet chamber at one end, and a process outlet chamber and a reactivation inlet chamber at the other end. Each housing is connected to the two chambers at each end by a distinct associated inlet or outlet. Discs mounted on each end of a rotatable shaft extending longitudinally from one end to the other, are configured to, (1) when a desiccant housing is in a dehumidification phase, close the inlet and outlet to the respective reactivation inlet and outlet chambers, while opening the inlet and outlet to the respective process inlet and outlet chambers; and, (2) when a desiccant housing is in a reactivation phase, open the inlet and outlet to the respective reactivation inlet and outlet chambers, while closing the inlet and outlet to the respective process inlet and outlet chambers.

24 Claims, 13 Drawing Sheets

U.S. PATENT DOCUMENTS

| | | |
|---|---|---|
| 4,877,429 | 10/1989 | Hunter . |
| 4,895,580 | 1/1990 | Morioka et al. .......................... 96/109 |
| 4,926,618 | 5/1990 | Ratliff ................................. 96/111 X |
| 4,968,334 | 11/1990 | Hilton . |
| 5,170,633 | 12/1992 | Kaplan ................................. 96/125 X |
| 5,230,719 | 7/1993 | Berner et al. . |
| 5,441,559 | 8/1995 | Petit et al. . |
| 5,464,468 | 11/1995 | Tanaka et al. . |
| 5,593,475 | 1/1997 | Minh . |
| 5,620,367 | 4/1997 | Khelifa ................................. 96/127 X |
| 5,661,983 | 9/1997 | Groten . |
| 5,667,560 | 9/1997 | Dunne ...................................... 95/113 |
| 5,688,305 | 11/1997 | Graeff ................................. 96/112 X |
| 5,702,508 | 12/1997 | Moratalla ............................. 96/125 X |
| 5,709,736 | 1/1998 | Fujimura ................................. 96/144 |
| 5,725,639 | 3/1998 | Khelifa et al. ........................... 96/112 |

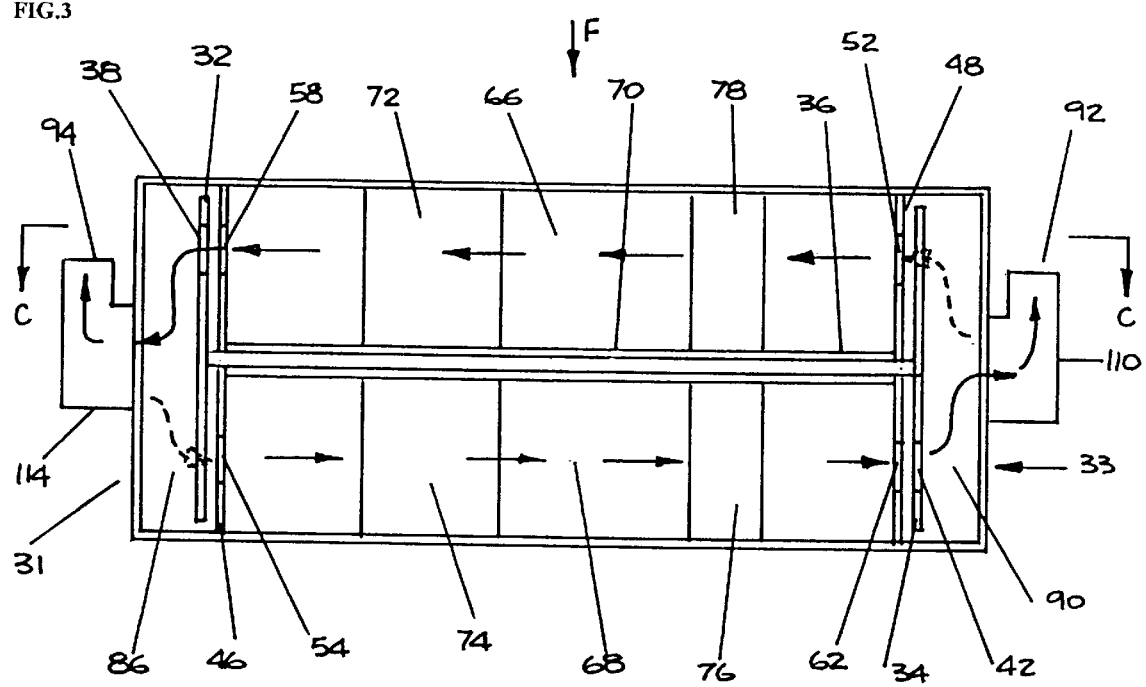
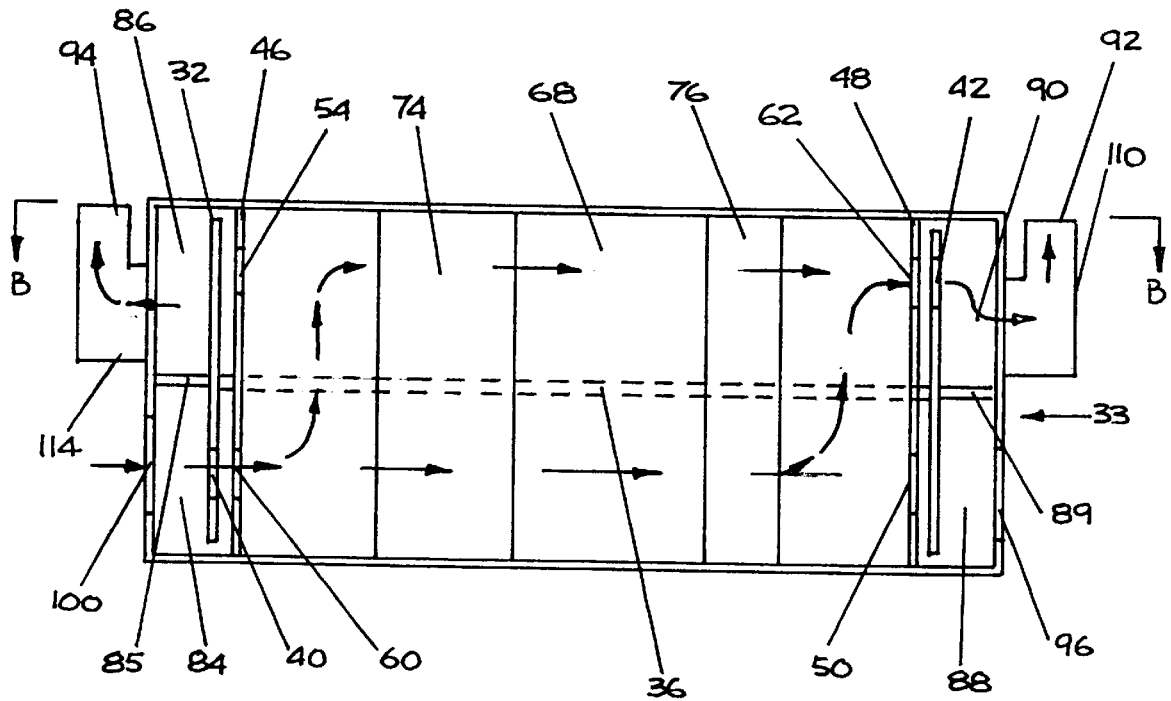

IN DIRECTION OF ARROW F

IN DIRECTION OF ARROW G

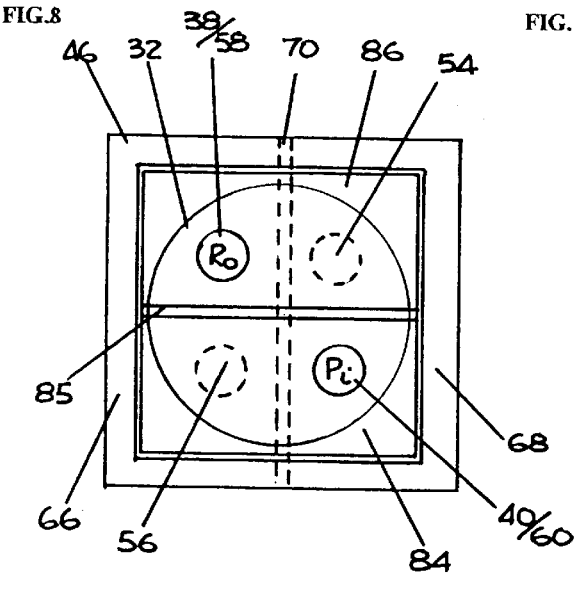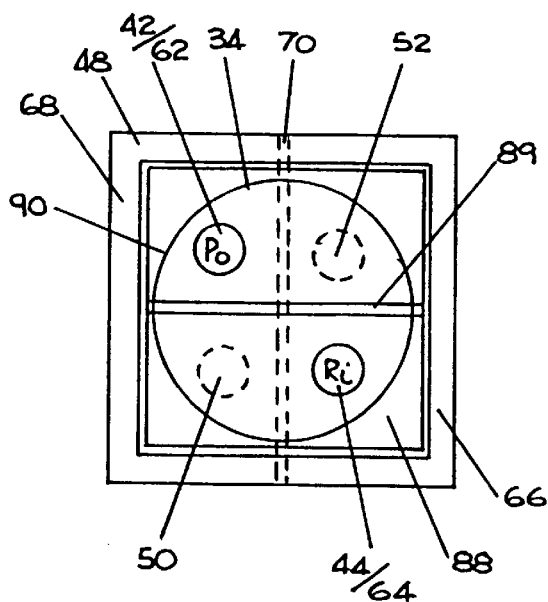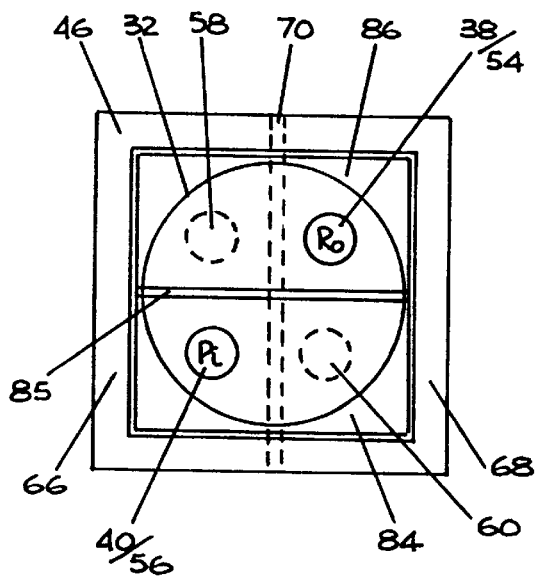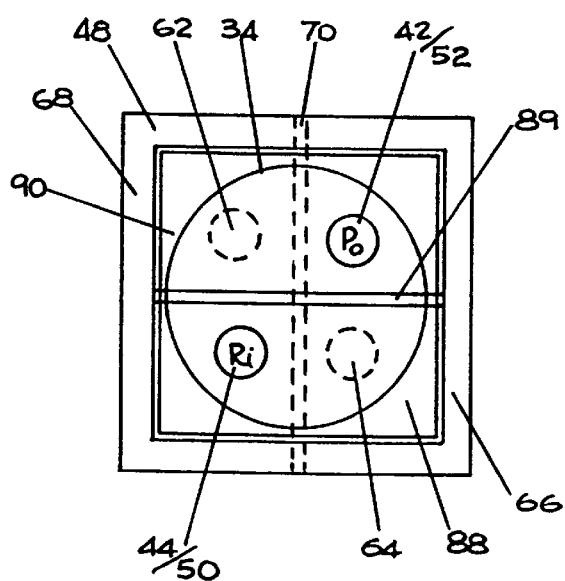

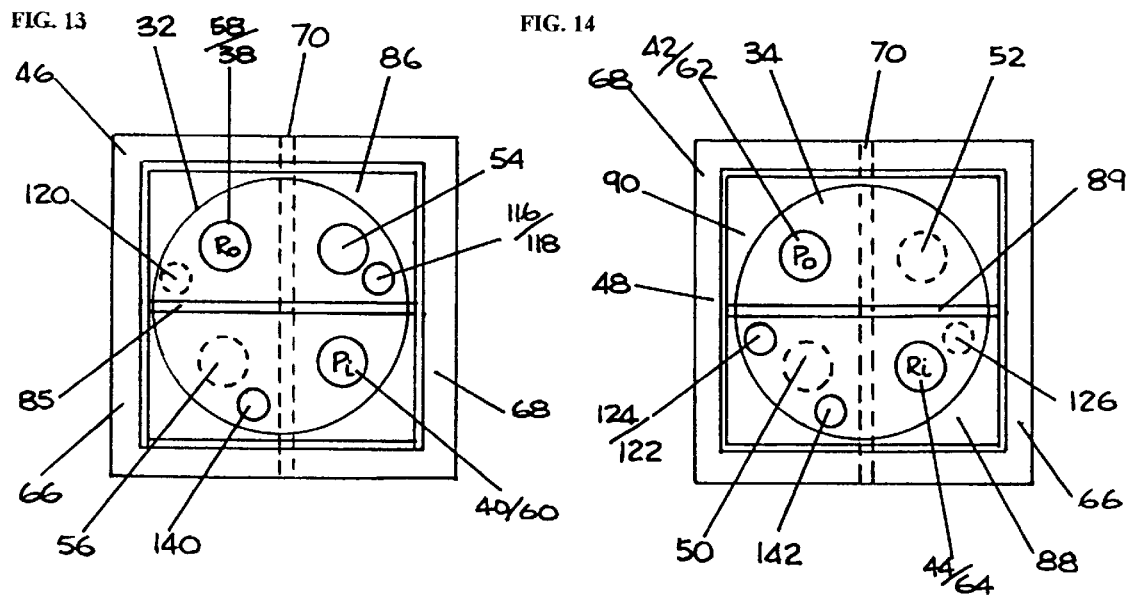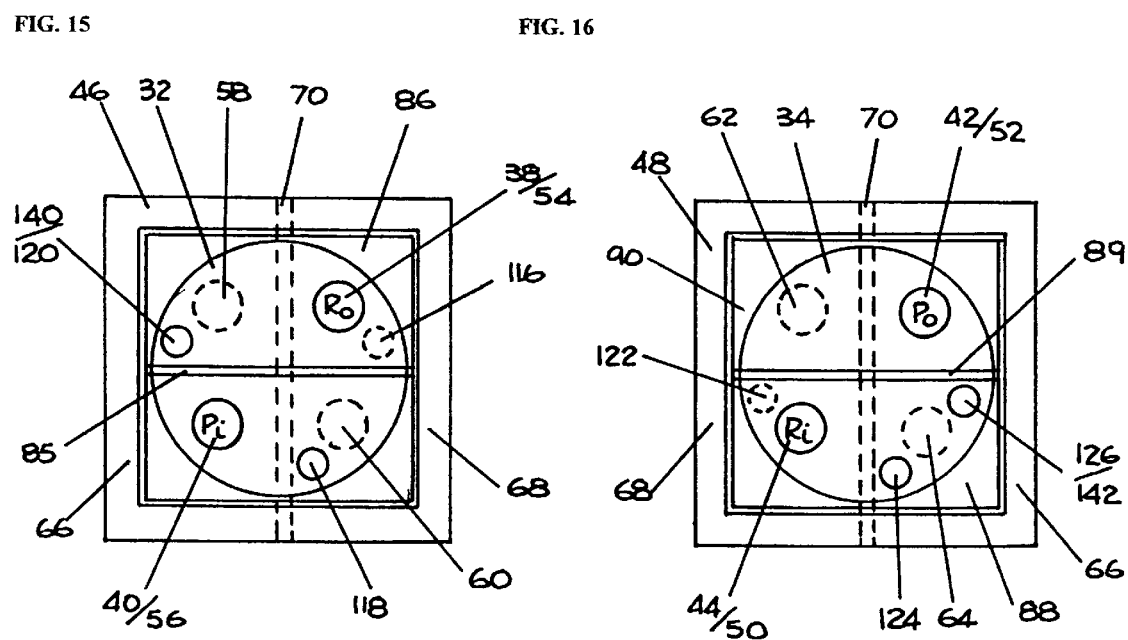

5,980,615

COMPACT AIR DRYER

FIELD OF THE INVENTION

The present invention relates to a compact air dryer and is particularly concerned with, although not limited to, dehumidifiers suitable for providing continuous dehumidification in low-capacity environments such as in small boats or motor homes.

BACKGROUND OF THE INVENTION

Desiccant air dryers differ from cooling-based dehumidifiers in that desiccants attract moisture from air by creating an area of low vapour pressure at the surface of the desiccant, instead of cooling the air to condense moisture. When the desiccant is cool and dry, its surface vapour pressure is low and it can attract moisture from ambient air, which, when humid, has a high vapour pressure. When the desiccant attracts moisture from the air, the desiccant becomes wetter, and rises in temperature due to the release of heat from the moisture of the air being dried. At some point, the desiccant will become sufficiently wet and hot that its surface vapour pressure is no longer significantly higher than the vapour pressure of the ambient air. At that point, the desiccant will no longer attract moisture from the air and will need to be dried or reactivated before being used to dry air again. In order to dry the desiccant, heated reactivation air can be blown through the desiccant, thereby heating the desiccant so that its vapour pressure is now higher than that of the heated reactivation air, and moisture is removed from the desiccant into the heated reactivation air. When the desiccant has been sufficiently dried, it is cooled, and can dry air again.

The foregoing description suggests a limitation of air dryers in circumstances where continuous dehumidification is required; namely, the moisture absorbing capability of the desiccant is periodically exhausted and must be restored before the desiccant can be used to dehumidify air again. Various solutions to this problem have been devised involving (1) moving desiccants between a reactivation air flow and a process air flow such that the process air is always being dehumidified by part of the desiccant while the dehumidifying capacity of the rest of the desiccant is being restored by the reactivation air flow; or, (2) having at least two separate air dryers, and periodically switching the reactivation air flow and the process air flow between these two separate air dryers such that process air is always being dehumidified by one of the desiccants while the other desiccant is being dried by the reactivation air.

One known desiccant arrangement that falls within the second of the above-described categories is a two-tower arrangement in which the two separate air dryers take the form of two separate packed towers. One end of each tower can switch between receiving process air via a process air inlet, and discharging reactivation air via a reactivation air outlet. The opposite end of each tower can switch between receiving reactivation air via a reactivation air inlet, and discharging process air via a process air outlet. This solid packed tower desiccant arrangement includes two valves that are operated together. A first valve controls the process air inflow and the reactivation air outflow, while the second valve controls the process air inflow and the reactivation air outflow. The valves are operated together such that when the first valve directs process air into a first tower and receives reactivation air from the second tower, the second valve is set to receive process air from the first tower and to direct reactivation air to the second tower. The setting of both valves are changed simultaneously to switch the reactivation air flow and the process air flow between the towers.

The tower arrangement suffers from the disadvantages that (1) it requires lots of room and equipment including complicated control mechanisms to redirect the reactivation air and process air periodically, and (2) it requires a high-pressure air supply. These problems render the tower arrangement inapplicable for lower-capacity and lower-pressure usage in small areas, such as in a small boat or in recreational vehicular homes.

SUMMARY OF THE INVENTION

An object of an aspect of the present invention is to provide an air dryer that is relatively compact, relatively easy to build and operate, and is suitable for use in low capacity environments.

In accordance with an aspect of the present invention there is provided an air dryer including a plurality of separate desiccant beds for providing continuous dehumidification. Each of the plurality of desiccant beds alternately receives process air and heated reactivation air such that each of the plurality of separate desiccant beds alternately dries process air during a dehumidification phase of that desiccant bed and is reactivated by heated reactivation air during a reactivation phase of such desiccant bed. The air dryer includes a process inlet chamber, a process outlet chamber, a reactivation inlet chamber, a reactivation outlet chamber, a plurality of desiccant housings, valve means, an automatic valve actuator, and a blower means.

The process inlet chamber has an external process air inlet for receiving process air at least partly from an air space to be dehumidified. The process inlet chamber also has a plurality of internal process air inlets in a process inlet wall downwind from the process inlet chamber and the external process air inlet, each of the plurality of internal process air inlets being for airflow communication with a distinct one of the plurality of separate desiccant beds.

The reactivation outlet chamber has an external reactivation air outlet for releasing humidified reactivation air outside of the air space to be dehumidified, and also has a plurality of internal reactivation air outlets in a reactivation outlet wall upwind from the reactivation outlet chamber and the external reactivation air outlet, each of the plurality of internal reactivation air outlets being for airflow communication with a distinct one of the plurality of separate desiccant beds.

The reactivation inlet chamber has an external reactivation air inlet for receiving reactivation air. The reactivation inlet chamber has a plurality of internal reactivation air inlets in a reactivation inlet wall downwind from the reactivation inlet chamber and the external reactivation air inlet, each of the plurality of internal reactivation air inlets being for airflow communication with a distinct one of the plurality of separate desiccant beds.

The process outlet chamber has an external process air outlet for releasing dehumidified process air into the air space to be dehumidified. The external process air outlet has a plurality of internal process air outlets in a process outlet wall upwind of the process outlet chamber and the external process air outlet, each of the plurality of internal process air outlets being for airflow communication with a distinct one of the plurality of separate desiccant beds.

Each of the plurality of desiccant beds is contained in a distinct one of the plurality of desiccant housings. The plurality of desiccant housings are mutually isolated such that the airflow through each desiccant housing in the plurality of desiccant housings is isolated from airflow paths through the other desiccant housings. Each desiccant housing in the plurality of desiccant housings is adjacent to (1) the process inlet chamber at the process inlet wall, (2) the process outlet chamber at the process outlet wall, (3) the reactivation inlet chamber at the reactivation inlet wall, and (4) the reactivation outlet chamber at the reactivation outlet wall. For each desiccant housing (5) the plurality of internal process air inlets includes a distinct associated process air inlet permitting direct airflow communication, when open, from the process air inlet chamber to that desiccant housing, (6) the plurality of internal process air outlets includes a distinct associated process air outlet, permitting direct airflow communication, when open, from such desiccant housing to the process air outlet chamber, (7) the plurality of internal reactivation air inlets includes a distinct associated reactivation air inlet, permitting direct airflow communication, when open, from the reactivation air inlet chamber to such desiccant housing, and (8) the plurality of internal reactivation air outlets includes a distinct associated reactivation air outlet, permitting direct airflow communication, when open, from such desiccant housing to the process air outlet chamber.

Each of the plurality of desiccant housings has a distinct associated one of the plurality of desiccant beds. The distinct associated desiccant bed is located, with respect to both the reactivation air flow and the process air flow, between (1) the distinct associated process air inlet and the distinct associated process air outlet, and (2) the distinct associated reactivation inlet and the distinct associated reactivation air outlet.

The air dryer includes valve means for alternating process air and reactivation air between each of the plurality of desiccant housings by synchronously opening and closing each of the plurality of process inlets, each of the plurality of process outlets, each of the plurality of reactivation inlets and each of the plurality of reactivation outlets. The process air and reactivation air are alternated between each of the plurality of desiccant housings such that for each desiccant housing (1) there is an associated dehumidification setting wherein the associated process inlet and the associated process outlet are open, and the associated reactivation inlet and the associated reactivation outlet are closed, (2) there is an associated reactivation setting wherein the associated reactivation inlet and the associated reactivation outlet are open, and the associated process inlet and the associated process outlet are closed. Furthermore, the process air and reactivation air are alternated between each of the plurality of desiccant housings such that for each setting there is at least one desiccant housing wherein the associated process inlet and the associated process outlet are open, and the associated reactivation inlet and the associated reactivation outlet are closed, so that continuous drying of process air is provided.

The automatic valve actuator is for automatically actuating the valve means to periodically alternate process air and reactivation air between each of the plurality of desiccant housings. The blower means is for generating reactivation air flow through each of the plurality of desiccant housings during the reactivation phase thereof, and is for generating process air flow through each of the plurality of desiccant housings during the dehumidification phase thereof.

In accordance with another embodiment of the present invention there is provided an air dryer including a plurality of separate desiccant beds arranged in parallel between a humid air end and a dry air end, each of the plurality of desiccant beds alternately receiving process air and heated reactivation air such that each of the plurality of separate desiccant beds alternately dehumidifies process air during a dehumidification phase of such desiccant bed and is reactivated by heated reactivation air during a reactivation phase of such desiccant bed.

At the humid air end distal to a humid air end wall from the plurality of desiccant beds, the air dryer includes a process inlet chamber and a reactivation outlet chamber. At the dry air end distal to a dry air end wall from the plurality of desiccant beds, the air dryer includes a reactivation inlet chamber and a process outlet chamber.

The process inlet chamber has an external process air inlet for receiving process air from an air space to be dehumidified. The process inlet chamber also has a plurality of internal process air inlets in the humid air end wall downwind from the process inlet chamber and the external process air inlet, each of the plurality of internal process air inlets being for airflow communication with a distinct one of the plurality of separate desiccant beds.

The reactivation outlet chamber has an external reactivation air outlet for releasing humidified reactivation air outside of the air space to be reactivated, and also has a plurality of internal reactivation air outlets in the humid air end wall upwind from the reactivation outlet chamber and the external reactivation air outlet. Each of the plurality of internal reactivation air outlets is for airflow communication with a distinct one of the plurality of separate desiccant beds.

The reactivation inlet chamber has an external reactivation air inlet for receiving reactivation air, and also has a plurality of internal reactivation air inlets in the dry air end wall downwind from the reactivation inlet chamber and the external reactivation air inlet. Each of the plurality of internal reactivation air inlets is for airflow communication with a distinct one of the plurality of separate desiccant beds.

The process outlet chamber has an external process air outlet for releasing dehumidified process air into the air space to be dehumidified, and also has a plurality of internal process air outlets in the dry air end wall upwind of the process outlet chamber and the external process air outlet. Each of the plurality of internal process air outlets is for airflow communication with a distinct one of the plurality of separate desiccant beds.

The air dryer further includes a plurality of desiccant housings, a rotary valve, an automatic valve actuator, and a blower means. Each of the plurality of desiccant beds is contained in a distinct one of the plurality of desiccant housings. Each of the plurality of desiccant housings is isolated from air flows within other desiccant housings of the plurality of desiccant housings, and is adjacent to (1) the process inlet chamber at the humid air end wall, (2) the process outlet chamber at the dry air end wall, (3) the reactivation inlet chamber at the dry air end wall, and (4) the reactivation outlet chamber at the humid air end wall. For each desiccant housing (5) the plurality of internal process air inlets includes a distinct associated process air inlet permitting direct airflow communication, when open, from the process air inlet chamber to such desiccant housing, (6) the plurality of internal process air outlets includes a distinct associated process air outlet, permitting direct airflow communication, when open, from such desiccant housing to the process air outlet chamber, (7) the plurality of internal reactivation air inlets includes a distinct associated reactivation air inlet permitting direct airflow communication, when open, from the reactivation air inlet chamber to such desiccant housing, and (8) the plurality of internal reactivation air outlets includes a distinct associated reactivation air outlet, permitting direct airflow communication, when open, from such desiccant housing to the process air outlet chamber.

Each of the plurality of desiccant housings has a distinct associated one of the plurality of desiccant beds, the distinct associated desiccant bed being located, with respect to both the reactivation air flow and the process air flow, between (1) the distinct associated process air inlet and the distinct associated process air outlet, and (2) the distinct associated reactivation inlet and the distinct associated reactivation air outlet.

The rotary valve is for alternating process air and reactivation air between each of the plurality of desiccant housings, and includes (1) a rotary shaft extending longitudinally between the humid air end and the dry air end, which is rotatable about a longitudinal axis of rotation to any one of a plurality of rotary settings; and, (2) a humid air end valve plate mounted on the rotary shaft at the humid air end. The humid air end valve plate is configured relative to the plurality of internal process air inlets and the plurality of internal reactivation air outlets such that (1) for each of the plurality of desiccant housings, the plurality of rotary settings includes an associated dehumidification setting wherein the humid air end valve plate covers and thereby closes the distinct associated reactivation air outlet and the humid air end valve plate leaves the distinct associated process air inlet uncovered and open. The configuration of the humid air end valve also provides that for each of the plurality of desiccant housings, the plurality of rotary settings includes an associated reactivation setting wherein the humid air end valve plate covers and thereby closes the distinct associated process air inlet and the humid air end valve plate leaves the distinct associated reactivation air outlet uncovered and open.

The dry air end valve plate is configured relative to the plurality of internal process air outlets and the plurality of internal reactivation air inlets and is mounted and oriented on the rotary shaft at the dry air end relative to the humid air end valve plate such that the following conditions are met: (1) for each of the plurality of desiccant housings and for each of the plurality of rotary settings, the dry air end plate covers the distinct associated process air outlet when the humid air end plate covers the distinct associated process air inlet, and covers the distinct associated reactivation air inlet when the humid air end plate covers the distinct associated reactivation air outlet, and (2) for each setting, there is at least one desiccant housing for which the associated process inlet and the associated process outlet are open, and the associated reactivation inlet and the associated reactivation outlet are closed so that continuous dehumidification of process air is provided.

The automatic valve actuator is for automatically actuating the rotary valve to periodically alternate process air and reactivation air between each of the plurality of desiccant housings. The blower means is for drawing reactivation air flow through each of the plurality of desiccant housings during the reactivation phase thereof, and for drawing process air flow through each of the plurality of desiccant housings during the dehumidification phase thereof.

In accordance with another aspect of the present invention, there is provided an air dryer including a desiccant component, the desiccant component alternately receiving and drying a process airflow during a dehumidification phase, and receiving and being reactivated by a heated reactivation airflow during a reactivation phase. The air dryer further comprises a process intake wall, a reactivation output wall, a reactivation intake wall, a process output wall, a desiccant casing for containing the desiccant component, valve means, an automatic valve actuator, and, a blower means.

The process intake wall has a process air intake for receiving process air from an air space to be dehumidified. The process intake wall and the process air intake are upwind from the desiccant component with respect to the process airflow. The process air intake permits the process airflow to communicate with the desiccant component during the dehumidification phase.

The reactivation output wall has a reactivation air outport for releasing the humidified reactivation airflow outside of the air space to be dehumidified. The reactivation air outport and the reactivation output wall are downwind from the desiccant component with respect to the reactivation airflow. The reactivation air outport is in airflow communication with the desiccant component during the reactivation phase.

The reactivation intake wall has a reactivation air intake for receiving the reactivation airflow. The reactivation intake wall and the reactivation air intake are upwind from the desiccant component with respect to the reactivation airflow. The reactivation air intake is for airflow communication with the desiccant component during the reactivation phase.

The process output wall has a process air outport for releasing dehumidified process air into the air space to be dehumidified. Both the process output wall and the process air outport are downwind of the desiccant component with respect to the process airflow.

The desiccant casing contains the desiccant component, and is adjacent to a process intake wall, a reactivation output wall, a reactivation intake wall, a process output wall. The process intake wall permits airflow communication from the air space to be dehumidified into the desiccant casing during the dehumidification phase. The process output wall permits airflow communication from the desiccant casing to the air space to be dehumidified during the dehumidification phase. The reactivation intake wall permits the reactivation airflow into the desiccant casing during the reactivation phase. The reactivation outport receives and releases the reactivation airflow from the desiccant casing during the reactivation phase.

The valve means is for alternating process air and reactivation air through the desiccant casing. Before the dehumidification phase, the valve means synchronously opens the process intake and the process output, while closing the reactivation intake and the reactivation output. Before the reactivation phase, the valve means synchronously opens the reactivation intake and the reactivation output, while closing the process intake and the process output.

The automatic valve actuator is for automatically actuating the valve means to periodically alternate process air and reactivation air through the desiccant casing. The blower means is for generating reactivation air flow through the desiccant casing during the reactivation phase thereof, and for generating process air flow through the desiccant casing during the dehumidification phase.

BRIEF DESCRIPTION OF THE DRAWINGS

FIG. 2 in a sectional view along line A—A of FIG. 1 illustrates a portion of the compact air dryer of FIG. 1;

FIG. 3 in a sectional view along line B—B of FIG. 1 illustrates a portion of the compact air dryer of FIG. 1;

FIG. 8 illustrates a sectional end view of the compact air dryer of FIG. 1 in the direction of arrow D of FIG. 1;

FIG. 9 illustrates a sectional end view of the compact air dryer of FIG. 1 in the direction of arrow E of FIG. 1;

FIG. 10 illustrates the sectional end view of the compact air dryer of FIG. 8 wherein the compact air dryer is at the second rotary setting and the reactivation air flow and process air flow have been switched;

FIG. 11 illustrates the sectional end of the compact air dryer of FIG. 9 wherein the compact air dryer is at the second rotary setting and the reactivation air flow and process air flow have been switched;

FIG. 13 illustrates a sectional end view of a preferred embodiment of the compact air dryer in the direction of arrow D of FIG. 12;

FIG. 14 illustrates a sectional end view of the compact air dryer of FIG. 12 in the direction of arrow E of FIG. 12;

FIG. 15 illustrates the sectional end view of the compact air dryer of FIG. 13 wherein the compact air dryer is at a second rotary setting and the reactivation air flow and process air flow have been switched;

FIG. 16 illustrates the sectional end view of the compact air dryer of FIG. 14 wherein the compact air dryer is at a second rotary setting and the reactivation air flow and process air flow have been switched;

DETAILED DESCRIPTION OF THE INVENTION WITH REFERENCE TO THE DRAWINGS

Figure 1:
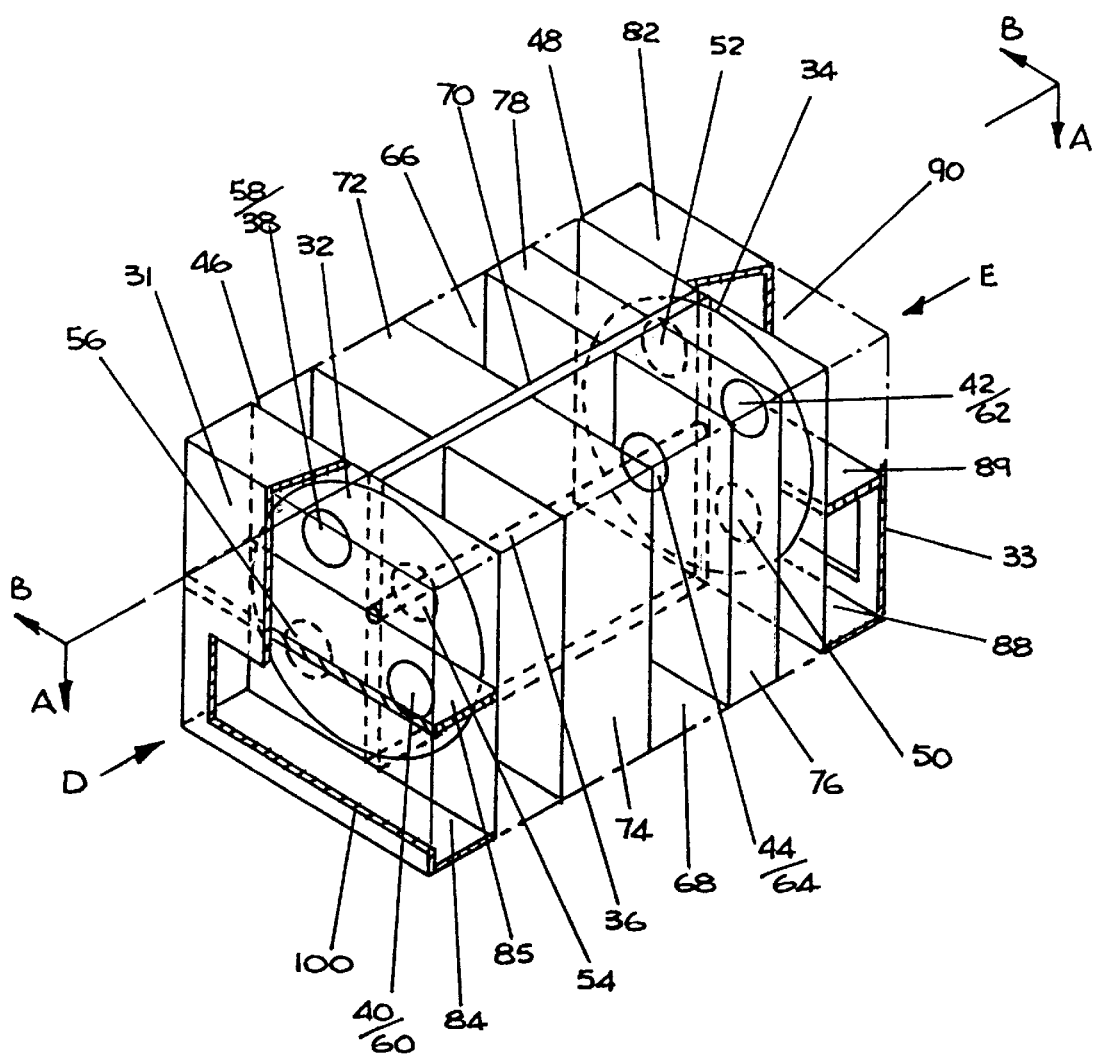
FIG. 1 illustrates, in a front and side oblique perspective view, a compact air dryer in accordance with a preferred embodiment of the invention wherein the compact air dryer is at a first rotary setting with respect to process and reactivation air flows.

Referring to FIG. 1, there is illustrated a compact air dryer in accordance with a preferred embodiment of the invention. The compact air dryer illustrated includes a first housing 66 and a second housing 68 separated by a wall 70. Each of the housings 66, 68, has a humid air end 31, associated with process air inflows and reactivation air outflows, and a dry air end 33, associated with process air outflows and reactivation air inflows. The inclusion of the adjectives "humid" and "dry" for the humid air end 31 and the dry air end 33 respectively is to contrast the conditions at each of these ends. In particular, both the process air and the reactivation air at the humid air end 31 may not be particularly humid; however, the process air and the reactivation air at the humid air end 31 will be more humid than the process air and the reactivation air at the dry air end 33.

The first housing 66 includes a first desiccant bed 72 and a first heater 78. The second housing 68 includes a second desiccant bed 74 and second heater 76. In both cases, the desiccant beds 72, 74 are closer to the humid air end 31 of the housings 66, 68 respectively, while the heaters 78, 76 are closer to the dry air end 33 of the housings 66, 68 respectively. The ends of the housings 66, 68 are closed by a humid air end wall 46 at the humid air end 31 and a dry air end wall 48 at the dry air end 33.

The humid air end wall 46 defines the upwind limit of each of the housings 66, 68 with respect to the process airflow, and the downwind limit of each of the housings 66, 68 with respect to the reactivation airflow. As shown in FIGS. 8 and 10, separated from the housings 66, 68 and bounded at their process airflow upwind and reactivation airflow downwind ends respectively by the end wall 46 are a process inlet chamber 84 and a reactivation outlet chamber 86. The process inlet chamber 84 and the reactivation outlet chamber 86 are separated from one another by a common boundary wall 85. The humid air end wall 46 has four openings for connecting the housings 66, 68 with the process inlet chamber 84 and the reactivation outlet chamber 86. Specifically, humid air end wall 46 includes (1) a first reactivation outlet 58 for connecting the reactivation outlet chamber 86 with the first housing 66; (2) a second reactivation outlet 54 for connecting the reactivation outlet chamber 86 with the second housing 68; (3) a first process inlet 56 for connecting the process inlet chamber 84 with the first housing 66; and, (4) a second process inlet 60 for connecting the process inlet chamber 84 with the second housing 68.

Similarly, the dry air end wall 48 defines the upwind limit of each of the housings 66, 68 with respect to the reactivation airflow, and the downwind limit of each of the housings 66, 68 with respect to the process airflow. As shown in FIGS. 9 and 11, separated from the housings 66, 68 and bounded at their process airflow upwind and reactivation airflow downwind ends respectively by the end wall 48 are a process outlet chamber 90 and a reactivation inlet chamber 88. The process outlet chamber 90 and the reactivation inlet chamber 88 are separated from one another by a common dividing wall 89. The dry air end wall 48 has four openings for connecting the housings 66, 68 with the reactivation inlet chamber 88 and the process outlet chamber 90. Specifically, the dry air end wall 48 includes (1) a first reactivation inlet 64 for connecting the reactivation inlet chamber 88 with the first housing 66; (2) a second reactivation inlet 50 for connecting the reactivation inlet chamber 88 with the second housing 68; (3) a first process outlet 52 for connecting the process outlet chamber 90 with the first housing 66; and (4) a second process outlet 62 for connecting the process outlet chamber 90 with the second housing 68.

The humid air end 31 is the end from which reactivation air is exhausted, via an external reactivation outlet 94, once such reactivation air has been humidified by reactivating one of the desiccant beds 72, 74, while the dry air end 33 is the end from which process air is exhausted, once such process air has been dehumidified by the other of the desiccant beds 72, 74. Reactivation air is both drawn in from and exhausted into an external environment outside the room being dehumidified by the air dryer, while process air is both drawn in from and exhausted into the room being dehumidified by the air dryer.

While one of the desiccant beds 72, 74 is dehumidifying process air, the other of the desiccant beds 72, 74 is being dried by reactivation air. Accordingly, one of the housings 66, 68 must have both the associated one of the reactivation inlets 50, 64 and the associated one of the reactivation outlets 54, 58 closed, and the associated one of the process inlets 56, 60 and the associated one of process outlets 52, 62 open. The other of the housings 66, 68 has both the associated one of the reactivation inlets 50, 64 and the associated one of the reactivation outlets 54, 58 open, and the associated one of the process inlets 56, 60 and the associated one of process outlets 52, 62 closed. This can be achieved using a variety of different mechanisms such as shutters or sliding doors. The compact air dryer shown uses discs 32, 34 mounted on a single rotatable shaft 36 extending through the wall 70 between the housings 66, 68, so that all of openings in the dry air end wall 48 and the humid air end wall 46 are opened and closed by a single actuating mechanism. The shaft 36 has two rotary settings: a first rotary setting in which the second desiccant bed 74 is dehumidifying process air while the first desiccant bed 72 is being reactivated by reactivation air, and a second rotary setting in which the first desiccant bed 72 is dehumidifying process air while the second desiccant bed 74 is being reactivated by reactivation air. FIGS. 1–4, 8 and 9 all show the air dryer in the first rotary setting, while FIGS. 5–7, 10 and 11 show the air dryer in the second rotary setting.

A humid air end disc 32 is mounted on the rotatable shaft 36 adjacent to humid air end wall 46 and a dry air end disc 34 is mounted on the opposite end of the rotatable shaft 36 adjacent to dry air end wall 48. Each of the discs 32, 34 has two apertures cut in opposite quadrants of the disc. Thus, the two apertures of each disc are aligned with different housings and different chambers. Humid air end disc 32 has apertures 38, 40, both of which are smaller than humid air end disc 32, and dry air end disc 34 has dry apertures 42, 44, both of which are smaller than dry air end disc 34. All of the apertures 38, 40, 42, 44 are spaced from the axis of rotation so that the apertures in each disc align with the openings in the end wall adjacent to such disc when the discs are rotated appropriately. Furthermore, humid air end disc 32 and dry air end disc 34 are fixed to shaft 36 such that (1) both discs 32, 34 rotate together, and (2) the apertures of humid air end disc 32 are aligned relative to the apertures of dry air end disc 34 such that for each of the two rotary settings, each chamber has one open inlet at one end wall, and one open outlet at the other end wall.

Specifically, at the first rotary setting shown in FIGS. 1–4, 8 and 9, aperture 38 in humid air end disc 32 aligns with reactivation outlet 58 to connect first housing 66 with the reactivation outlet chamber 86, while aperture 40 aligns with process inlet 60 to connect second housing 68 with process inlet chamber 84. Dry air end disc 34 is aligned relative to humid air end disc 32 such that at the first rotary setting aperture 44 in dry air end disc 34 aligns with reactivation inlet 64 to connect first housing 66 with the reactivation inlet chamber 88, while aperture 42 aligns with process outlet 62 to connect second housing 68 with the process outlet chamber 90. The process air is expelled from the process outlet chamber 90 via an external process outlet 92 by a process blower 114, while the reactivation inlet chamber 88 receives reactivation air from an outside space via an external reactivation inlet 96. At the second rotary setting, aperture 38 in humid air end disc 32 aligns with reactivation outlet 54 to connect second housing 68 with reactivation outlet chamber 86, while aperture 40 aligns with process inlet 56 to connect first housing 66 with process inlet chamber 84. Similarly, aperture 44 in dry air end disc 34 aligns with reactivation inlet 50 to connect second housing 68 with reactivation inlet chamber 88, while aperture 42 aligns with process outlet 52 to connect first housing 66 with the process outlet chamber 90.

FIGS. 1–4, 8 and 9 all show the illustrated air dryer in the first rotary setting described above, in which the discs are oriented as shown in FIGS. 1, 8 and 9. Referring to FIG. 8, aperture 38 in humid air end disc 32 is aligned with first reactivation outlet 58 to connect first housing 66 with reactivation outlet chamber 86, while aperture 40 is aligned with process inlet 60 to connect the other of the housings 68 with the process inlet chamber 84. The reactivation air is expelled from the reactivation outlet chamber 86 via an external reactivation outlet 94 by a reactivation blower 114, while the process inlet chamber 84 receives process air from the room to be dehumidified via an external process inlet 100.

Figure 4:
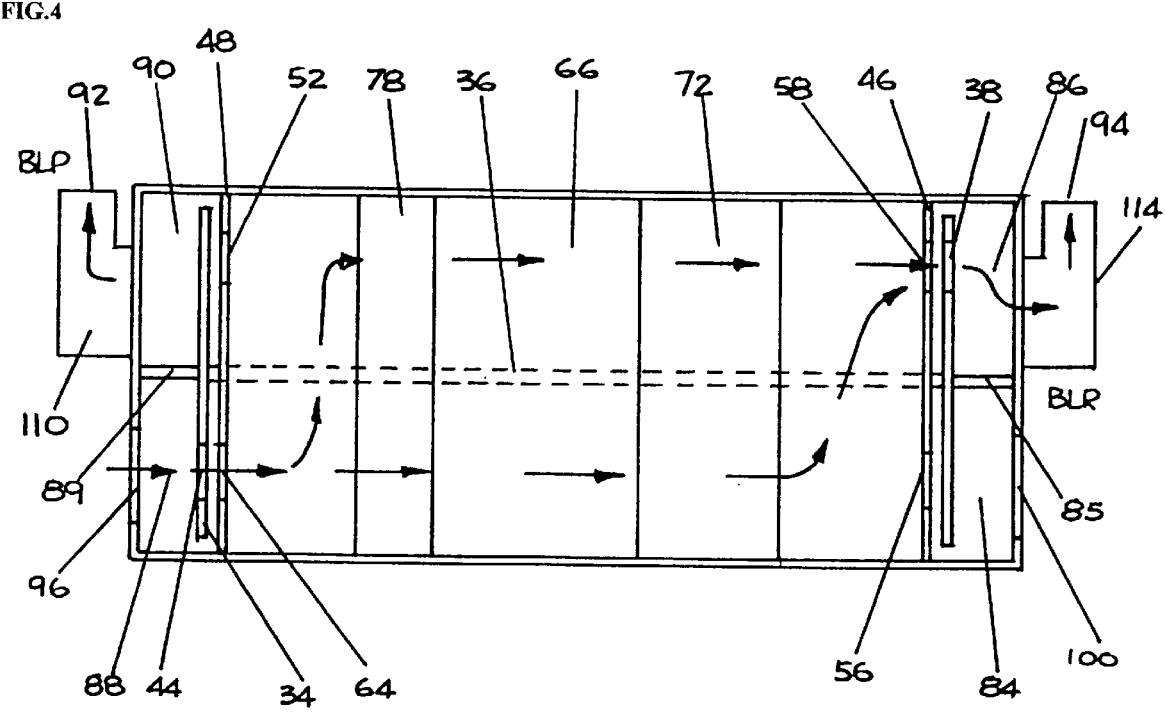
FIG. 4 in a sectional view along line C—C of FIG. 3 illustrates a portion of the compact air dryer of FIG. 1.
Figure 5:
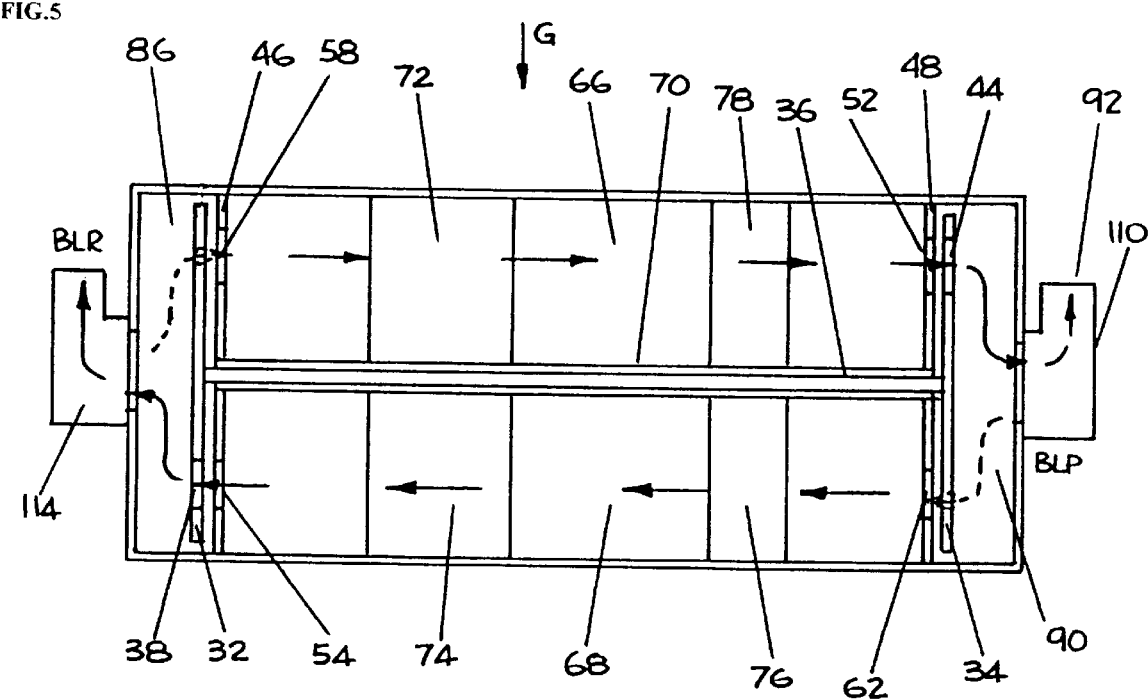
FIG. 5 illustrates the sectional view of FIG. 3 wherein the compact air dryer is at a second rotary setting and the reactivation air flow and process air flow have been switched.
Figure 6:
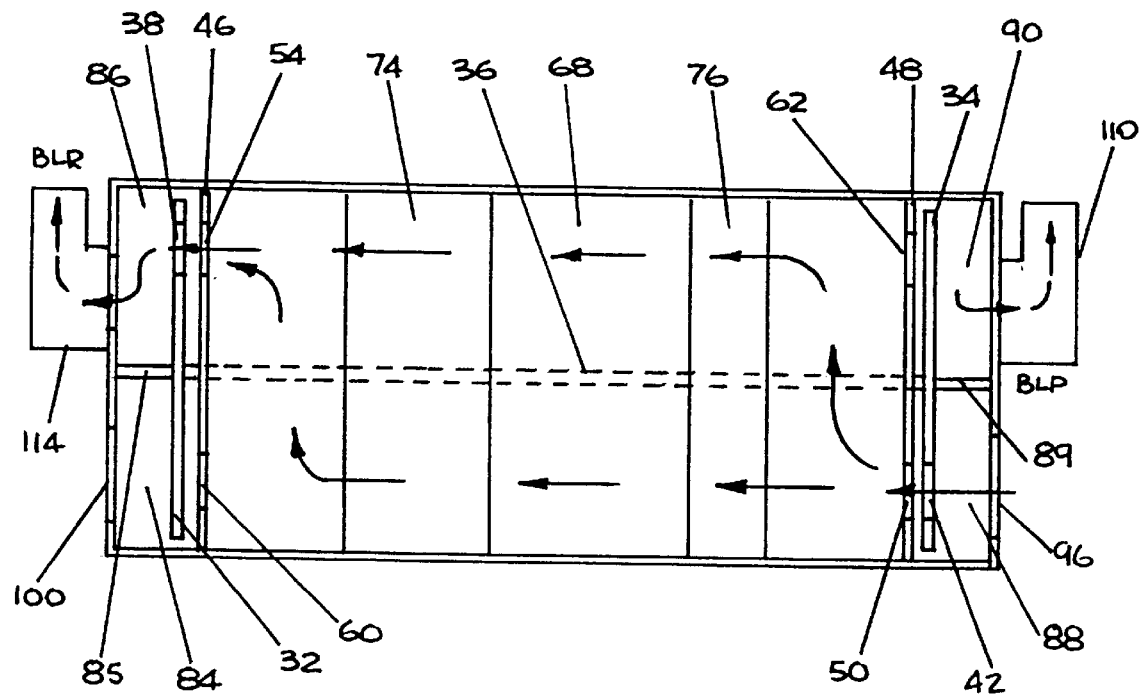
FIG. 6 illustrates the sectional view of FIG. 2 wherein the compact air dryer is at the second rotary setting and the reactivation air flow and process air flow have been switched.
Figure 7:
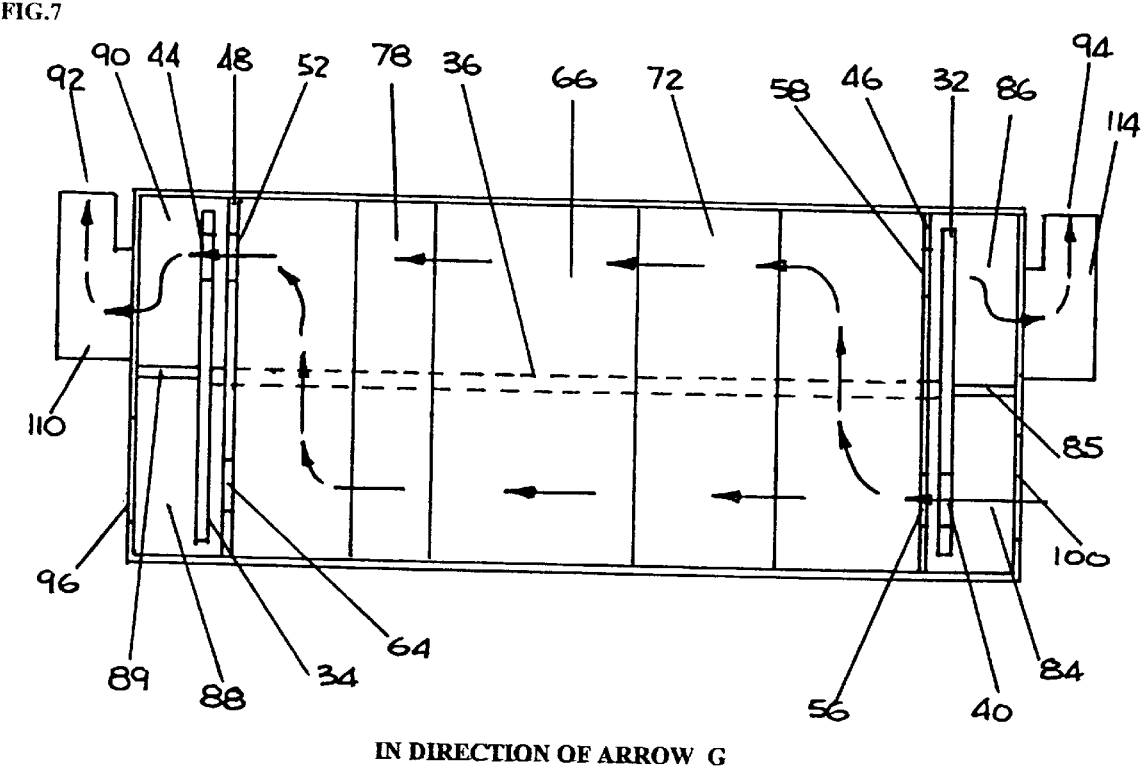
FIG. 7 illustrates the sectional view of FIG. 4 wherein the compact air dryer is at the second rotary setting and the reactivation air flow and process air flow have been switched.

FIG. 2 illustrates the second housing 68 including second desiccant bed 74 and second heater 76 during the dehumidification phase of the second desiccant bed 74, which occurs when the shaft 36 is in its first rotary setting. FIG. 2 also illustrates the reactivation outlet chamber 86 and process inlet chamber 84 at the humid air end 31 of the second housing 68, and the reactivation inlet chamber 88 and process outlet chamber 90 at the dry air end 33. As shown in FIGS. 3, and 4, when the shaft 36 is at the first rotary setting and the process air flow is being dehumidified by second desiccant bed 74 in second housing 68, first desiccant bed 72 in first housing 66 is being reactivated by reactivation air flow. As shown in FIGS. 5 and 7, when shaft 36 is rotated to the second rotary setting, the reactivation air flow and process air flow are switched between first housing 66 and second housing 68 such that the process air flow is directed through the first housing 66 and desiccant bed 72 to the process outlet chamber 90, while, as shown in FIGS. 5 and 6, the reactivation air flow is directed from the reactivation inlet chamber 88, through the second housing 68, heater 76 and desiccant bed 74, to the reactivation outlet chamber 86.

All of the apertures 38, 40, 42 and 44 are in different quadrants of their respective discs, and, as mentioned above, apertures in the same disc are in opposite quadrants. Accordingly, each housing, and each end of both housings, will have one upper outlet open and one lower inlet open, as the reactivation outlet chamber 86 is located above the process inlet chamber 84 while the reactivation inlet chamber 88 is located below the process outlet chamber 90. Thus, the two apertures, one from each disc, aligned with the same housing, will connect, via the housing, either the process inlet chamber 84 and process outlet chamber 90, or the reactivation inlet chamber 88 and the reactivation outlet chamber 86.

To operate as shown, rotatable shaft 36 and discs 32, 34 must be rotatable through at least 90°. Rotating the shaft by 90° covers all of the end wall openings that were formerly uncovered, and uncovers all of end wall openings that were formerly covered. This switches the reactivation and process air flows between the housings 66, 68. For example, as described above, when the rotatable shaft 36 is at a first rotary setting shown in FIGS. 8 and 9, humid air end disc 32 covers first process inlet 56 and second reactivation outlet 54, as the quadrants of humid air end disc 32 that are aligned with first process inlet 56 and second reactivation outlet 54 lack apertures. Humid air end disc 32 leaves uncovered second process inlet 60, which is aligned with aperture 40, and first reactivation outlet 58, which is aligned with aperture 38. Dry air end disc 34 covers first process outlet 52 and second reactivation inlet 50, as the quadrants of dry air end disc 34 that are aligned with first process outlet 52 and second reactivation inlet 50 lack apertures. Dry air end disc 34 leaves uncovered second process outlet 62, which is aligned with aperture 42, and first reactivation inlet 64, which is aligned with aperture 44. The process blower 110 creates a lower pressure in process outlet chamber 90 thereby drawing a process air flow through the second housing 68 from the humid air end 31 to the dry air end 33. The reactivation blower 114 creates a lower pressure in reactivation outlet chamber 86 thereby drawing a reactivation air flow through the housing 66 from the dry air end 33 to the humid air end 31. The reactivation air flow is heated by the heater 78 before reaching and reactivating the desiccant 72 of first housing 66.

When the shaft is rotated through 90°, humid air end disc 32, as shown in FIG. 10, covers second process inlet 60 and first reactivation outlet 58, and leaves uncovered first process inlet 56 and second reactivation outlet 54. As shown in FIG. 11, dry air end disc 34 covers second process outlet 62 and first reactivation inlet 64, and leaves uncovered first process outlet 52 and second reactivation inlet 50. This switches the air flows such that reactivation air flows through the second housing 68 from the dry air end 33 to the humid air end 31, and process air flows through the housing 66 from the humid air end 31 to the dry air end 33. The reactivation air flow is heated by the heater 76 before reaching and reactivating the desiccant 74 of second housing 68. The process air flow is warmed by desiccant 72 removing moisture before the process air flow reaches heater 78, which is still warm from heating the prior reactivation air flow. This reduces the thermal shock to which heater 78, and, after the next switch, heater 76, are subjected.

The discs 32 and 34 may optionally be rotated by 90° steps in one direction only, or may be rotated 90° one way, and then back 90° the other way. The 90° rotations should be separated by a time period sufficient for reactivation of the desiccant currently being subjected to the reactivation air flow.

By incorporating the four external chambers, namely the process inlet chamber 84 and the reactivation outlet chamber 86 at the humid air end 31 of the housings 66 and 68, and the process outlet chamber 90 and the reactivation inlet chamber 88 at the dry air end 33 of the housings 66 and 68, it is possible to make the air dryer both compact and relatively easy to manufacture. By incorporating the rotatable shaft 36, the humid air end disc 32 and the dry air end disc 34, continuous reactivation and process air flows can be switched between the housings 66, 68 using a simple, inexpensive and compact mechanism.

FIGS. 12–20 illustrate another preferred embodiment of the air dryer of the present invention.

During reactivation, each of the desiccant beds 72, 74 is heated by the heated reactivation air. At least some heat will be retained by the reactivated one of desiccant beds 72, 74 when dehumidification starts after reactivation is completed. Furthermore, during dehumidification, moisture will be transferred from the process air, which has a comparatively high vapour pressure, to the surface of the desiccant, which has a comparatively low vapour pressure. This transfer from a high vapour pressure to a low vapour pressure will be accompanied by the release of energy from the process air flow. This energy is released into the desiccant in the form of heat, thereby heating the desiccant. The rate at which the desiccant can absorb such energy will depend on the desiccant's temperature; the higher the desiccant's temperature, the lower the rate of heat transfer between the process air and the desiccant and the lower the rate of transfer of moisture from the process air to the desiccant. Accordingly, the temperature of the desiccant should be maintained at a relatively low level when such desiccant is dehumidifying process air, in order to enhance the drying function of the desiccant. In the alternative preferred embodiment illustrated in FIG. 12, whichever of the desiccant beds 72, 74 that is currently dehumidifying process air is cooled by cooling air from the reactivation inlet chamber 88.

Figure 12:
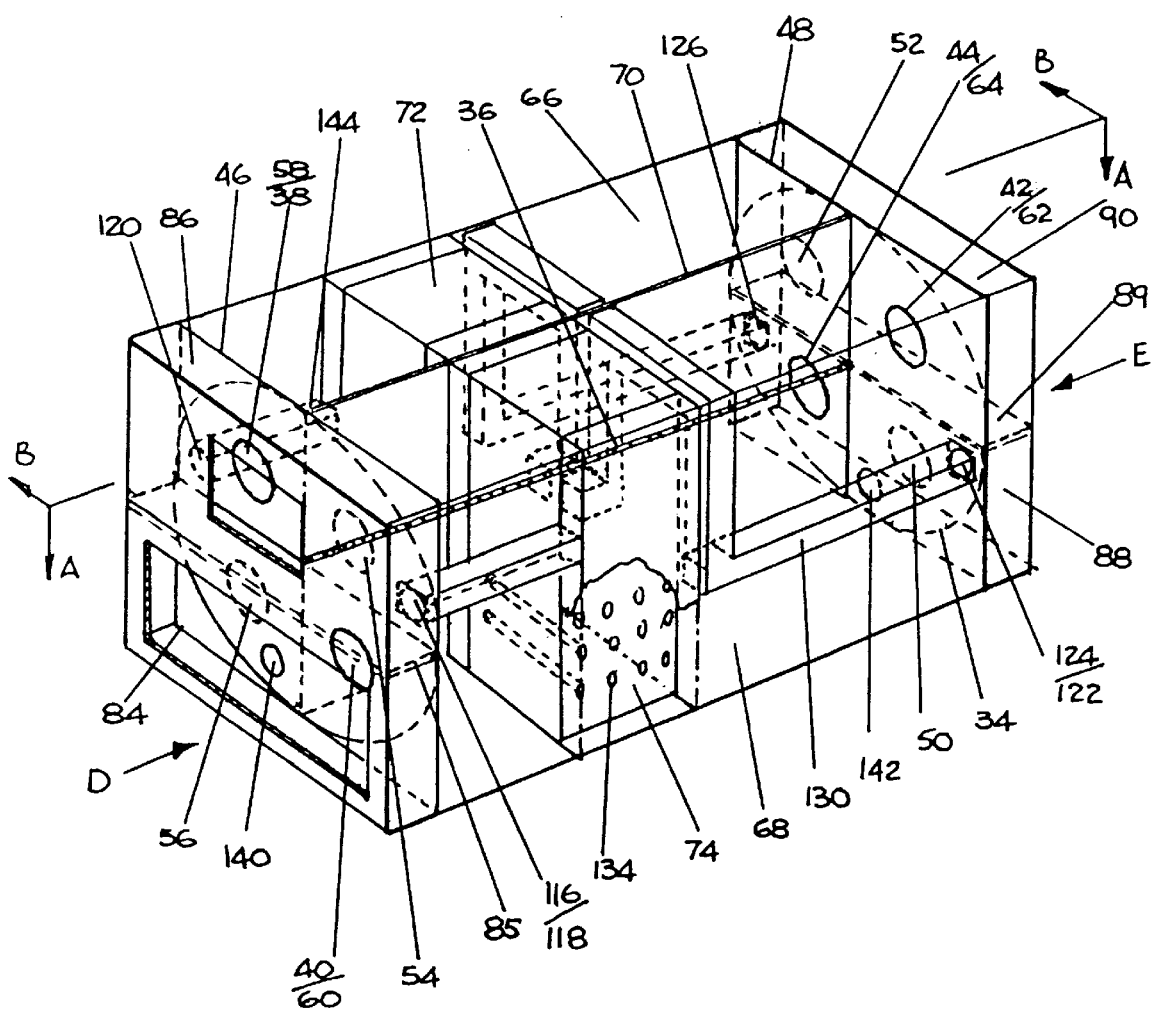
FIG. 12 illustrates, in a front and side oblique perspective view, a compact air dryer in accordance with a preferred embodiment of the invention.
Figure 18:
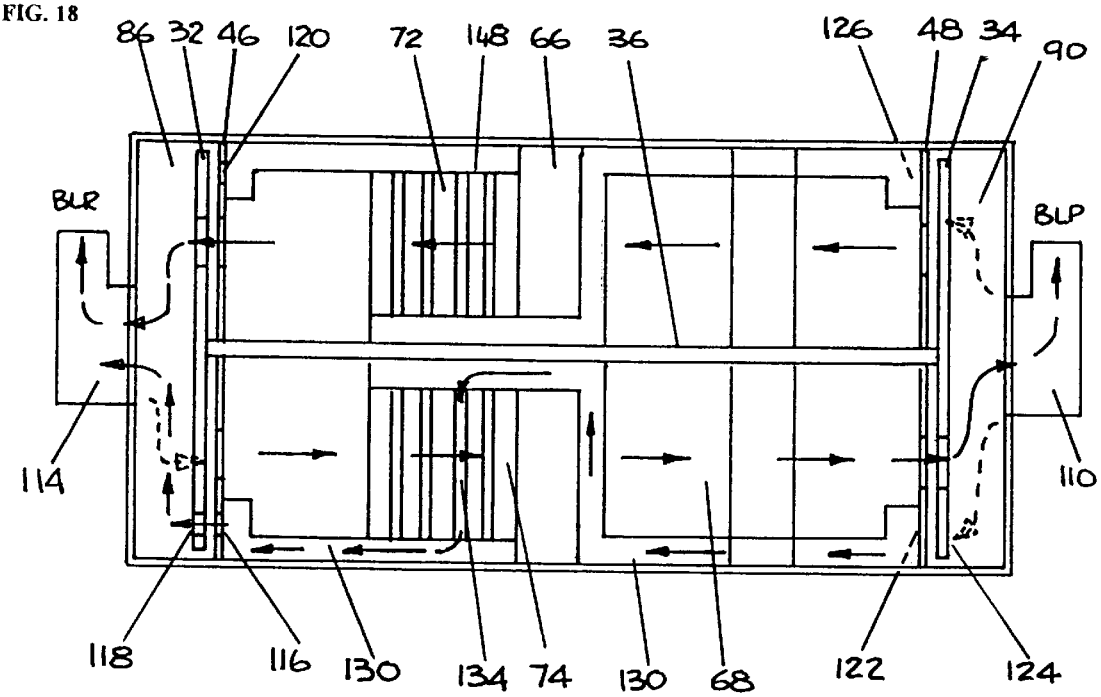
FIG. 18 in a sectional view along line B—B of FIG. 17 illustrates a portion of the compact air dryer of FIG. 1.
Figure 17:
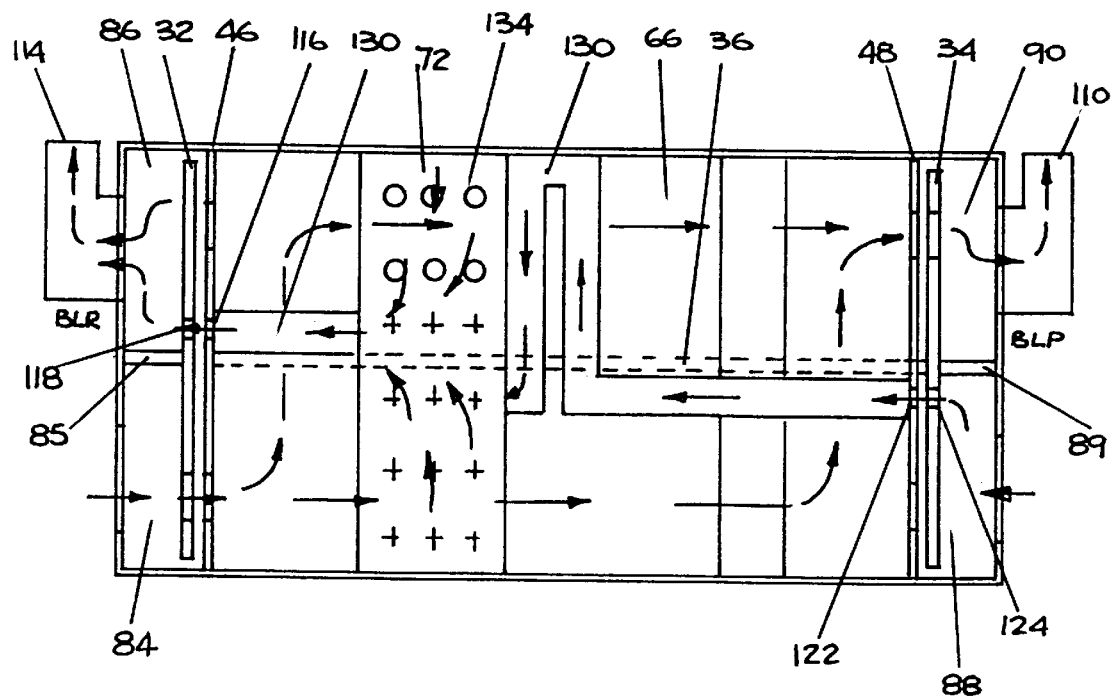
FIG. 17 in a sectional view along line A—A of FIG. 12 illustrates a portion of the compact air dryer of FIG. 12.
Figure 19:
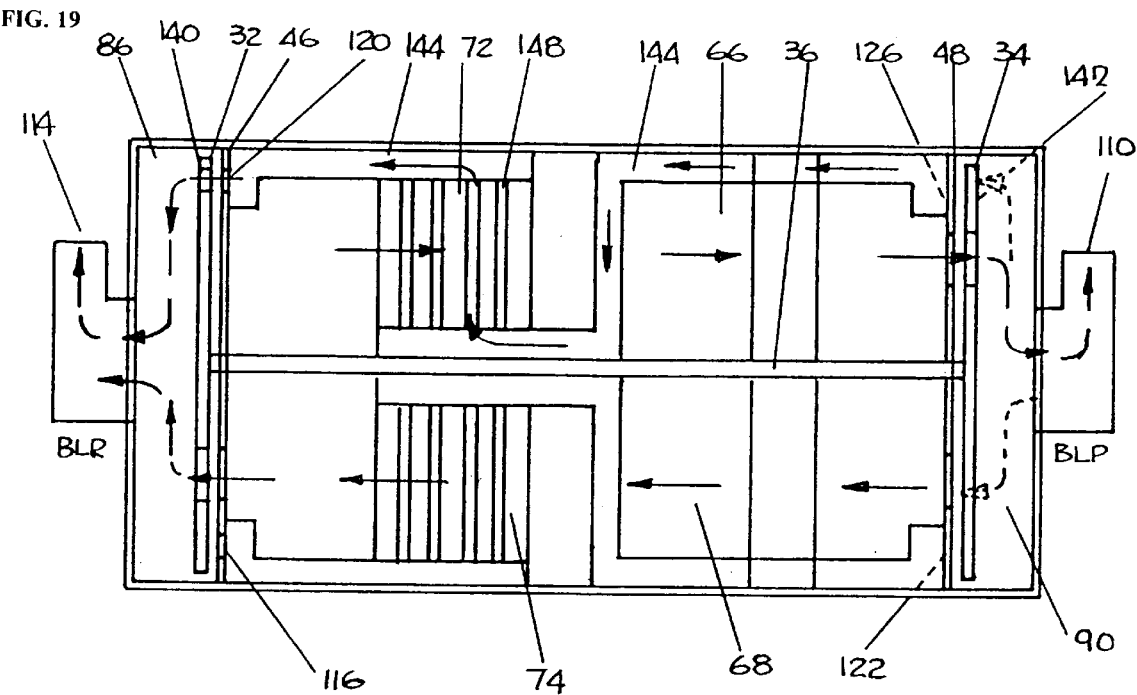
FIG. 19 illustrates the sectional view of FIG. 18 wherein the compact air dryer is at a second rotary setting and the reactivation air flow and process air flow have been switched.
Figure 20:
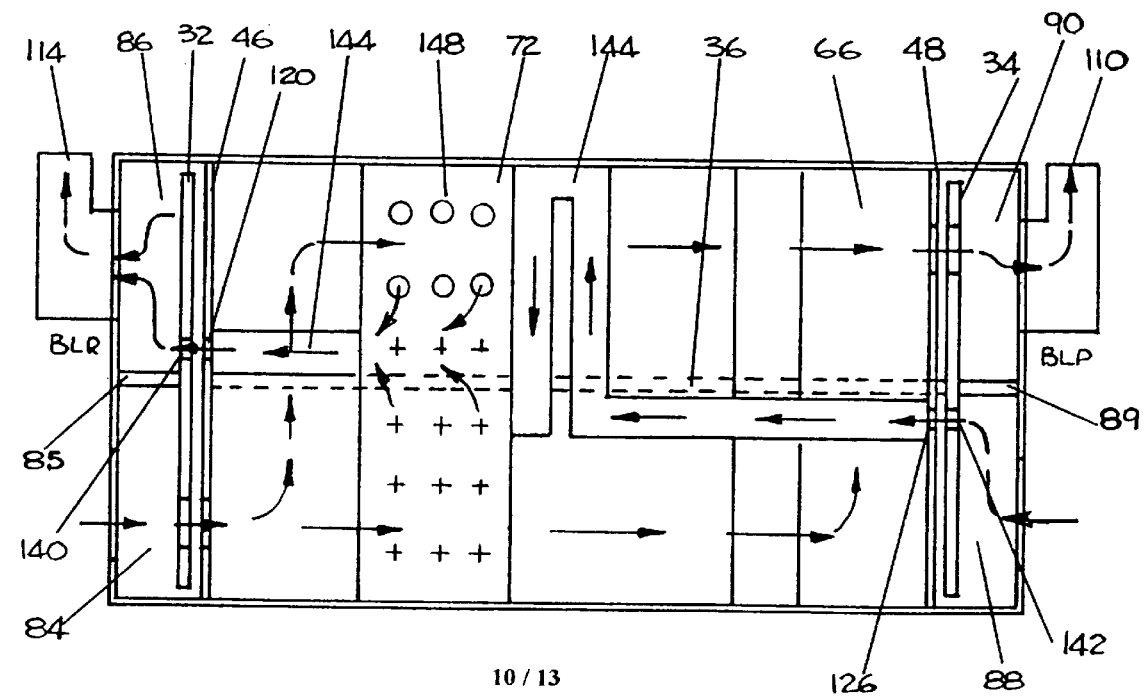
FIG. 20 illustrates a sectional view of FIG. 19 along line C—C wherein the compact air dryer is at a second rotary setting and the reactivation air flow and process air flow have been switched.

As shown in FIGS. 12, 17 and 18, cooling of the second desiccant bed 74 is effected by a cooling air flow through second heat exchanger tubes 134 when the shaft 36 is at the first rotary setting and the second desiccant bed 74 is dehumidifying process air. When the shaft 36 is at the first rotary setting, first desiccant bed 72 is being reactivated. Accordingly, as shown in FIG. 18, first heat exchanger tubes 148 do not receive any cooling air and, accordingly, do not cool the first desiccant bed 72. Second heat exchanger tubes 134 are connected to a second cooling inlet 122 in the dry air end wall 48 by a second coolant conduit 130, and are also connected to a second cooling outlet 116 in humid air end wall 46. First heat exchanger tubes 148 are connected to a first cooling inlet 126 in the dry air end wall 48 by a first coolant conduit 144, and are also connected to a first cooling outlet 120 in humid air end wall 46. Similar to the reactivation air flow and the process air flow, allocation of the cooling air flow is controlled by the rotary shaft 36.

Referring to FIGS. 13–16, humid air end disc 32 has two cooling outlet apertures 118, 140 and dry air end disc 34 has two cooling inlet apertures 124, 142. When the rotary shaft 36 is at the first rotary setting, as shown in FIGS. 12–14 and 17–18, cooling aperture 124 aligns with second cooling inlet 122, and cooling outlet aperture 118 aligns with second cooling outlet 116, to permit cooling air flow to flow from reactivation inlet chamber 88 to reactivation outlet chamber 86 via second cooling conduit 130 and second heat exchanger tubes 134. However, at the first rotary setting, humid air end disc 32 covers first cooling outlet 120 and dry air end disc 34 covers first cooling inlet 126, thereby blocking cooling air flow through first cooling conduit 144 and first heat exchanger tubes 148.

When shaft 36 is rotated to the second rotary setting, as shown in FIGS. 15–16 and 19–20, cooling inlet aperture 142 aligns with first cooling inlet 126, and cooling outlet aperture 140 aligns with first cooling outlet 120, to permit cooling air flow to flow from reactivation inlet chamber 88 to reactivation outlet chamber 86 via first cooling conduit 144 and first heat exchanger tubes 148. However, at the second rotary setting, humid air end disc 32 covers second cooling outlet 116 and dry air end disc 34 covers second cooling inlet 122, thereby blocking cooling air flow through second cooling conduit 130 and second heat exchanger tubes 134.

In the preferred embodiment shown in FIG. 12, cooling air flow can be allocated to the desiccant dehumidifying the process air flow using the same simple, inexpensive and compact mechanism, namely the rotary shaft 36 combined with discs 32, 34, that is used to switch the continuous reactivation and continuous process air flows can be switched between the housings 66, 68 using a very simple, inexpensive and compact mechanism.

Figure 21:
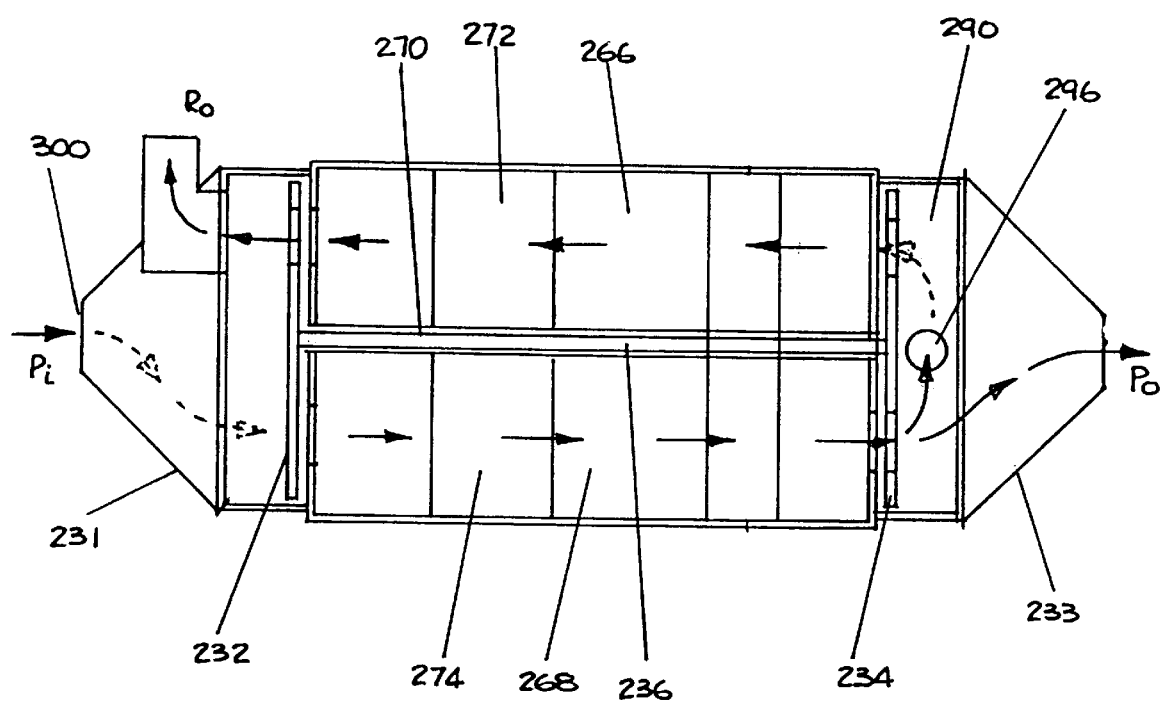
FIG. 21 is a sectional view of an embodiment of the invention similar to that shown in FIG. 3, except that the airflow paths have been modified to provide for a purge airflow.
Figure 22:
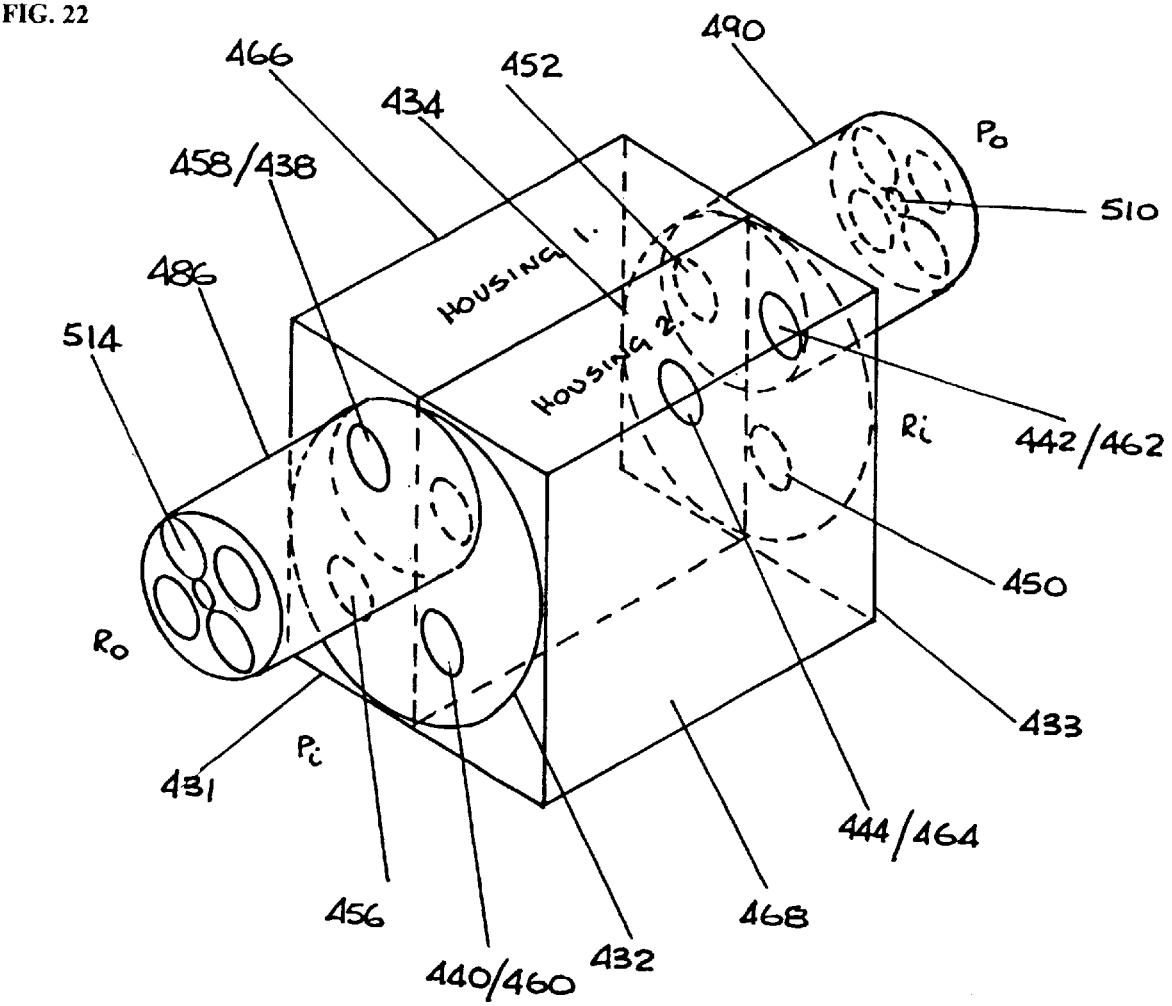
FIG. 22 illustrates, in a front and side oblique perspective view, a compact air dryer in accordance with an embodiment of an invention that lacks the process outlet chamber, the process inlet chamber, the reactivation inlet chamber, and the reactivation outlet chamber; and, FIG. 23 illustrates, in a front and side oblique perspective view, a compact air dryer in accordance with an embodiment of an invention having only a single desiccant bed.
Figure 23:
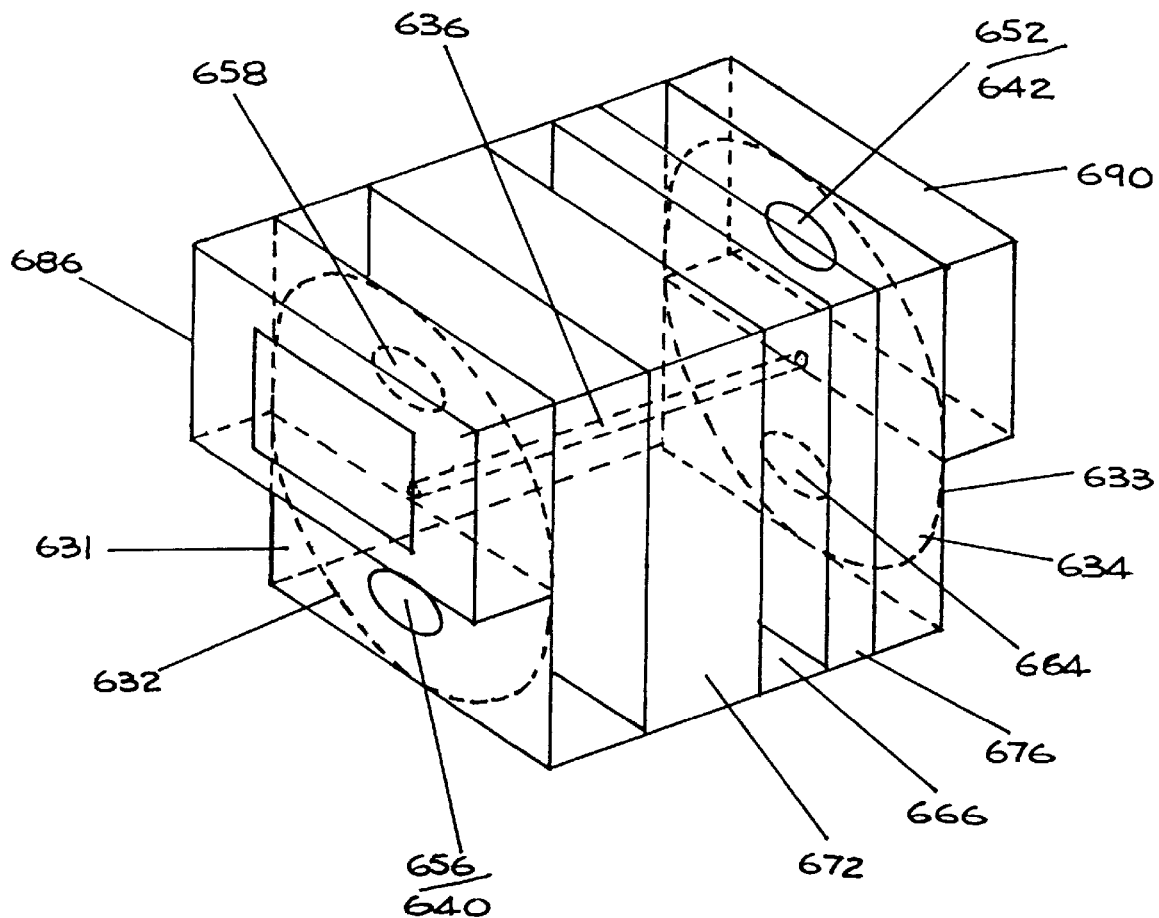

Three alternative embodiments are illustrated in FIGS. 21–23. Referring to FIG. 21, there is illustrated a compact air dryer in accordance with an embodiment of the invention providing for a purge airflow, in which the reactivation air flow is taken from the dehumidified process airflow in order to ensure that the incoming reactivation air is comparatively dry and, consequently, more effectively reactivates desiccant beds 272, 274. In order to make up for the process air that is used for reactivation, some of the process airflow is drawn from a source outside the room to be dehumidified.

Similar to the preferred embodiment of the invention illustrated in FIG. 1, the compact air dryer illustrated in FIG. 21 includes a first housing 266 and a second housing 268 separated by a wall 270. Each of the housings 266, 268, has a humid air end 231, associated with process air inflows and reactivation air outflows, and a dry air end 233, associated with process air outflows and reactivation air inflows.

Unlike the preferred embodiment illustrated in FIG. 1, the external process inlet 300 receives the process airflow from both inside and outside the airspace to be dehumidified. Once that process airflow enters the process inlet chamber (not shown), the manner in which it flows through the desiccant housings 268 and 266 is essentially analogous to the process airflow in the embodiment of FIG. 1; as with the embodiment of FIG. 1, the allocation of the reactivation airflow and the process airflow between desiccant housings 266 and 268, is controlled by a rotary shaft 236, a dry end disc 234 and a humid air end disc 232. The path of the process airflow after it has been received by a process outlet chamber 290 once again diverges to some extent from that of the embodiment of FIG. 1. Unlike the embodiment of FIG. 1, the process outlet chamber 290 and a reactivation inlet chamber are not isolated; an external reactivation inlet 296 connects the process outlet chamber 290 and the reactivation inlet chamber. Consequently, while some of the dehumidified process airflow is released into the air space to be dehumidified, the remainder of the dehumidified process air flow is drawn into the reactivation inlet chamber via the external reactivation inlet 296. After reactivating the desiccant bed, this reactivation air is discharged outside the air space to be dehumidified.

FIG. 22 illustrates an embodiment of the invention lacking the reactivation inlet chamber, the reactivation outlet chamber, the process inlet chamber and the process outlet chamber. Instead, the air dryer of FIG. 22 is mounted such that the air dryer transfixes a barrier separating the air space to be dehumidified from an outside airspace. In the embodiment illustrated in FIG. 22, the wet end 431 is inside the airspace to be dehumidified while the dry end 433 is outside the airspace to be dehumidified. The first process air inlet 456 and second process air inlet 460 draw air directly from the airspace to be dehumidified. Reactivation airflow is drawn out through first reactivation outlet 458 and second reactivation outlet 454 into a reactivation outlet conduit 486 by a reactivation blower 514. The reactivation airflow is isolated from the airspace being dehumidified by the reactivation outlet conduit 450, and is discharged in the outside space. As with the preferred embodiment illustrated in FIG. 1, allocation of the reactivation air flow and the process air flow between the first housing 466 and the second housing 468 is controlled by two discs 432, 434, both of which are rotatable by a rotary shaft (not shown). At a first rotary setting shown in FIG. 22, when wet apertures 438 and 440 align with first reactivation outlet 458 and second process inlet 460, the process air is dehumidified by the second desiccant bed (not shown) in the second desiccant housing 468, while the first desiccant bed (not shown) in the first desiccant housing 466 is reactivated by the reactivation airflow. At a second rotary setting (not shown), wet apertures 438 and 440 align with second reactivation outlet 454 and first process inlet 456. In the second rotary setting, the process air is dehumidified by the first desiccant bed in the first desiccant housing 466, while the second desiccant bed in the second desiccant housing 468 is reactivated by the reactivation airflow.

At the dry end 433 in the outside airspace, first reactivation air inlet 464 and second reactivation air inlet 450 draw air directly from the outside airspace. Process airflow is drawn out through first process outlet 452 and second process outlet 454 into a process outlet conduit 490 by a process blower 510. The process outlet conduit 490 isolates the dehumidified process air flow from the outside space, and discharges the process airflow back into the room to be dehumidified. At the first rotary setting, shown in FIG. 22, dry apertures 442 and 444 align with second process outlet 462 and first reactivation inlet 464 respectively; at the second rotary setting (not shown), the dry apertures 442 and 444 align with first process outlet 452 and second reactivation inlet 450, thereby, in conjunction with the realigning of the wet apertures 438 and 440 at the wet end 431, switching the process airflow and the reactivation air flow between the first desiccant housing 466 and the second desiccant housing 468.

FIG. 23 illustrates an embodiment of the invention that, similar to the embodiment of FIG. 22, lacks the reactivation inlet chamber and the process inlet chamber; however, unlike the embodiment of FIG. 22, the embodiment of FIG. 23 includes both a reactivation outlet chamber and the process outlet chamber. Instead, the air dryer of FIG. 23, as with the air dryer of FIG. 22, is mounted such that the air dryer transfixes a barrier separating the air space to be dehumidified from an outside airspace. Unlike the embodiment of FIG. 22, the embodiment of FIG. 23 has only a single desiccant housing 666, containing only a single desiccant bed 672 and a single heater 676. Accordingly, the embodiment of FIG. 23 does not provide continuous dehumidification.

In the embodiment illustrated in FIG. 23, the wet end 631 is inside the airspace to be dehumidified while the dry end 633 is outside the airspace to be dehumidified. The process air inlet 656 draws air directly from the airspace to be dehumidified. Reactivation airflow is drawn out through reactivation outlet 658 into a reactivation outlet chamber 686. The reactivation airflow is isolated from the airspace being dehumidified by the reactivation outlet conduit (not shown) that discharges the reactivation airflow to the outside space. Alternating the reactivation air flow and the process air flow through housing 666 is controlled by two discs 632, 634, both of which are rotatable by a rotary shaft 636. At a first rotary setting shown in FIG. 23, wet aperture 640 aligns with process inlet 656, the process air is dehumidified by the desiccant bed 672. At a second rotary setting (not shown), wet aperture 640 aligns with reactivation outlet 658. In the second rotary setting, the desiccant bed 672 is reactivated by the reactivation airflow.

At the dry end 633 in the outside airspace, reactivation air inlet 664 draws air directly from the outside airspace. The process airflow exits the desiccant housing 666 through process outlet 652 into a process outlet chamber 690. From the process outlet chamber 690, the process airflow is isolated from the outside airspace and discharged back into the airspace being dehumidified by a process outlet conduit (not shown). At the first rotary setting, shown in FIG. 23, dry aperture 642 aligns with process outlet 652; at the second rotary setting (not shown), dry aperture 642 aligns with reactivation inlet 650, thereby, in conjunction with the realigning of wet aperture 640 at the wet end 631, alternating the process airflow and the reactivation air flow through the desiccant housing 666.

Variations of what has been described and illustrated in this specification will readily occur to those skilled in the technology. For example, it is not necessary that the heaters 76, 78 be located within their respective desiccant housings 68, 66; instead, the reactivation air flow could be heated at any point prior to passing through the desiccant, and the process air flow could be unheated. Furthermore, it is not necessary that a rotary shaft 36 be provided to rotate dry air end disc 34 and humid air end disc 32; instead, sliding end plates having appropriately located apertures could be positioned at the humid air end 31 and dry air end 33 of the housings such shifting the end plates between two linear settings would reallocated the cooling, reactivation and process air flows between the desiccant beds. In addition, it is not necessary that the reactivation air flow and process air flow proceed in opposite directions through the desiccants; both air flows could originate from the same end of the housings. While the blowing means used is preferably of the "draw through" type, "blow through" blowing means may also be used. Accordingly, the invention is not to be limited by the specifics or embodiments described above; the scope of the invention is as defined in the claims.

What is claimed is:

1. In an air dryer including a plurality of separate desiccant beds, each of the plurality of desiccant beds alternately receiving process air and heated reactivation air such that each of the plurality of separate desiccant beds alternately dries process air during a dehumidification phase of such desiccant bed and is reactivated by heated reactivation air during a reactivation phase of such desiccant bed, (a) a process inlet chamber having an external process air inlet for receiving process air at least partly from an air space to be dehumidified, and a plurality of internal process air inlets in a process inlet wall downwind from the process inlet chamber and the external process air inlet, each of the plurality of internal process air inlets being for airflow communication with a distinct one of the plurality of separate desiccant beds;

(b) a reactivation outlet chamber having an external reactivation air outlet for releasing humidified reactivation air outside of the air space to be dehumidified, and a plurality of internal reactivation air outlets in a reactivation outlet wall upwind from the reactivation outlet chamber and the external reactivation air outlet, each of the plurality of internal reactivation air outlets being for airflow communication with a distinct one of the plurality of separate desiccant beds;

(c) a reactivation inlet chamber having an external reactivation air inlet for receiving reactivation air, and a plurality of internal reactivation air inlets in a reactivation inlet wall downwind from the reactivation inlet chamber and the external reactivation air inlet, each of the plurality of internal reactivation air inlets being for airflow communication with a distinct one of the plurality of separate desiccant beds;

(d) a process outlet chamber having an external process air outlet for releasing dehumidified process air into the air space to be dehumidified, and a plurality of internal process air outlets in a process outlet wall upwind of the process outlet chamber and the external process air outlet, each of the plurality of internal process air outlets being for airflow communication with a distinct one of the plurality of separate desiccant beds;

(e) a plurality of desiccant housings, each of the plurality of desiccant beds being contained in a distinct one of the plurality of desiccant housings, the plurality of desiccant housings being mutually isolated such that the airflow through each desiccant housing in the plurality of desiccant housings is isolated from airflow paths through the other desiccant housings in the plurality of desiccant housings, each desiccant housing in the plurality of desiccant housings being adjacent to (i) the process inlet chamber at the process inlet wall, (ii) the process outlet chamber at the process outlet wall, (iii) the reactivation inlet chamber at the reactivation inlet wall, (iv) the reactivation outlet chamber at the reactivation outlet wall, such that for each desiccant housing of the plurality of desiccant housings, (v) the plurality of internal process air inlets includes a distinct associated process air inlet permitting direct airflow communication, when open, from the process air inlet chamber to such desiccant housing, (vi) the plurality of internal process air outlets includes a distinct associated process air outlet, permitting direct airflow communication, when open, from such desiccant housing to the process air outlet chamber, (vii) the plurality of internal reactivation air inlets includes a distinct associated reactivation air inlet, permitting direct airflow communication, when open, from the reactivation air inlet chamber to such desiccant housing, and (viii) the plurality of internal reactivation air outlets includes a distinct associated reactivation air outlet, permitting direct airflow communication, when open, from such desiccant housing to the process air outlet chamber, each of the plurality of desiccant housings having a distinct associated one of the plurality of desiccant beds, the distinct associated desiccant bed being located, with respect to both the reactivation air flow and the process air flow, between (ix) the distinct associated process air inlet and the distinct associated process air outlet, and (x) the distinct associated reactivation inlet and the distinct associated reactivation air outlet;

(f) valve means for alternating process air and reactivation air between each of the plurality of desiccant housings by synchronously opening and closing each of the plurality of process inlets, each of the plurality of process outlets, each of the plurality of reactivation inlets and each of the plurality of reactivation outlets, such that for each desiccant housing (i) there is an associated dehumidification setting wherein the associated process inlet and the associated process outlet are open, and the associated reactivation inlet and the associated reactivation outlet are closed, (ii) there is an associated reactivation setting wherein the associated reactivation inlet and the associated reactivation outlet are open, and the associated process inlet and the associated process outlet are closed, and for each setting, there is at least one desiccant housing wherein the associated process inlet and the associated process outlet are open, and the associated reactivation inlet and the associated reactivation outlet are closed, so that continuous drying of process air is provided;

(g) an automatic valve actuator for automatically actuating the valve means to periodically alternate process air and reactivation air between each of the plurality of desiccant housings; and, (h) a blower means for generating reactivation air flow through each of the plurality of desiccant housings during the reactivation phase thereof, and for generating process air flow through each of the plurality of desiccant housings during the dehumidification phase thereof.

2. The air dryer as defined in claim 1 wherein the valve means comprises (a) a driving means having a plurality of settings; and, (b) a plurality of sealing plates attached to the driving means for movement therewith, the plurality of sealing plates engaging with the process inlet wall, the process outlet wall, the reactivation inlet wall and the reactivation outlet wall and movable relative thereto; wherein (c) in each setting of the plurality of settings, the plurality of sealing plates are mutually oriented and configured such that (i) for each desiccant housing in the dehumidification phase, the plurality of sealing plates open the associated process inlet of the plurality of process inlets and the associated process outlet of the plurality of process outlets, and close the associated reactivation inlet of the plurality of reactivation inlets and the associated reactivation outlet of the plurality of reactivation outlets, (ii) for each desiccant housing in the reactivation phase, the plurality of sealing plates open the associated reactivation inlet of the plurality of reactivation inlets and the associated reactivation outlet of the plurality of reactivation outlets, and close the associated process inlet of the plurality of process inlets and the associated process outlet of the plurality of process outlets, (d) for each desiccant housing (i) there is an associated dehumidification setting wherein the associated process inlet and the associated process outlet are open, and the associated reactivation inlet and the associated reactivation outlet are closed, and (ii) there is an associated reactivation setting wherein the associated reactivation inlet and the associated reactivation outlet are open, and the associated process inlet and the associated process outlet are closed.

3. The air dryer as defined in claim 2 wherein the plurality of desiccant housings extend between a humid air end, including the process inlet wall and the reactivation outlet wall, and a dry air end, including the process outlet wall and the reactivation inlet wall, each of the process inlet chamber and the reactivation outlet chamber being adjacent to each of the plurality of desiccant housings at the humid air end, and each of the process outlet chamber and the reactivation inlet chamber being adjacent to each of the plurality of desiccant housings at the dry air end, such that reactivation air and process air flow in opposite directions through each of the plurality of desiccant housings.

4. The air dryer as defined in claim 3 wherein the driving means comprises a unitary driving mechanism.

5. The air dryer as defined in claim 4 wherein the unitary driving mechanism comprises a rotary shaft extending longitudinally between the humid air end and the dry air end, the rotary shaft being rotatable about a longitudinal axis of rotation to any one of a plurality of rotary settings, and the plurality of sealing plates comprise a humid air end valve plate and a dry air end valve plate, (b) the humid air end valve plate being mounted on the rotary shaft at the humid air end and configured relative to the plurality of internal process air inlets and the plurality of internal reactivation air outlets such that (i) for each of the plurality of desiccant housings and for each of the plurality of rotary settings, the humid air end valve plate covers and thereby closes one of the distinct associated process air inlet and the distinct associated reactivation air outlet while the other of the distinct associated process air inlet and the distinct associated reactivation air outlet is uncovered and open, (ii) for each of the plurality of desiccant housings, the plurality of rotary settings includes an associated dehumidification setting wherein the humid air end valve plate covers and thereby closes the distinct associated reactivation air outlet and the humid air end valve plate leaves the distinct associated process air inlet uncovered and open, (iii) for each of the plurality of desiccant housings, the plurality of rotary settings includes an associated reactivation setting wherein the humid air end valve plate covers and thereby closes the distinct associated process air inlet and the humid air end valve plate leaves the distinct associated reactivation air outlet uncovered and open; and (c) the dry air end valve plate mounted on the rotary shaft at the dry air end and being configured relative to the plurality of internal process air outlets and the plurality of internal reactivation air inlets such that for each of the plurality of desiccant housings and for each of the plurality of rotary settings, the dry air end valve plate covers and thereby closes one of the distinct associated process air outlet and the distinct associated reactivation air inlet while uncovering and thereby opening the other of the distinct associated process air outlet and the distinct associated reactivation air inlet;

wherein the dry air end valve plate is oriented about the shaft relative to the humid air end valve plate such that, for each of the plurality of desiccant housings and for each of the plurality of rotary settings, the humid air end plate covers the distinct associated process air inlet when the dry air end plate covers the distinct associated process air outlet.

6. The air dryer as defined in claim 5 wherein for each desiccant housing and each setting, the valve means effects one and only one of (a) opening the associated process inlet and the associated process outlet, while closing the associated reactivation inlet and the associated reactivation outlet; and, (b) opening the associated reactivation inlet and the associated reactivation outlet, while closing the associated process inlet and the associated process outlet;

such that each desiccant housing is in one of the dehumidification phase and the reactivation phase.

7. The air dryer as defined in claim 5 wherein the blower means comprises
   (a) a reactivation blower mounted in the reactivation outlet chamber for drawing reactivation air through the air dryer and for expelling the humidified reactivation air from the reactivation outlet chamber; and,
   (b) a process blower mounted in the process outlet chamber for drawing process air through the air dryer and for expelling the dehumidified process air from the process outlet chamber into the air space to be dehumidified.

8. The air dryer as defined in claim 3 further comprising a support structure for mutually attaching the plurality of desiccant housings, the process inlet chamber, the process outlet chamber, the reactivation inlet chamber, the reactivation outlet chamber, the blower means and the valve as a single integral unit.

9. The air dryer as defined in claim 3 wherein the driving means comprises a rotary shaft extending longitudinally between the humid air end and the dry air end, the rotary shaft being rotatable about a longitudinal axis of rotation to any one of a plurality of rotary settings, and the plurality of sealing plates comprise a humid air end valve plate and a dry air end valve plate such that
   (a) each of the humid air end valve plate and the dry air end valve plate is mounted on the rotary shaft and includes a plurality of apertures,
   (b) the plurality of apertures in the humid air end valve plate being arranged relative to the plurality of internal process air inlets and the plurality of internal reactivation air outlets such that
      (i) for each of the plurality of desiccant housings and for each of the plurality of rotary settings, all of the plurality of apertures in the humid air end valve plate are offset from one of the distinct associated process air inlet and the distinct associated reactivation air outlet such that the same is closed by the humid air end valve plate, while one of the plurality of apertures in the humid air end valve plate is aligned with the other of the distinct associated process air inlet and the distinct associated reactivation air outlet such that the other of the distinct associated process air inlet and the distinct associated reactivation air outlet is left uncovered and open by the humid end valve plate,
      (ii) for each of the plurality of desiccant housings, the plurality of rotary settings includes an associated dehumidification setting wherein all of the plurality of apertures in the humid air end valve plate are offset from the distinct associated reactivation air outlet such that the humid air end valve plate covers and thereby closes the distinct associated reactivation air outlet, and
      (iii) for each of the plurality of desiccant housings, the plurality of rotary settings includes an associated reactivation setting wherein all of the plurality of apertures in the humid air end valve plate are offset from the distinct associated process air inlet such that the humid air end valve plate covers and thereby closes the distinct associated process air inlet; and
   (c) the plurality of apertures in the dry air end valve plate being arranged relative to the plurality of internal process air outlets, the plurality of internal reactivation air inlets and the plurality of apertures in the humid air end valve plate such that for each of the plurality of desiccant housings and for each of the plurality of rotary settings,
      (i) all of the plurality of apertures in the dry air end valve plate are offset from, the dry air end valve plate thereby covering, one of the distinct associated process air outlet and the distinct associated reactivation air inlet, and
      (ii) one of the plurality of apertures in the dry air end valve plate is aligned with, the dry air end valve plate thereby uncovering and leaving open, the other of the distinct associated process air outlet and the distinct associated reactivation air inlet;
   wherein the dry air end valve plate is oriented about the shaft relative to the humid air end valve plate such that, for each of the plurality of desiccant housings and for each of the plurality of rotary settings, when all of the plurality of apertures in the humid air end valve plate are offset from the distinct associated reactivation air outlet then all of the plurality of apertures in the dry air end valve plate are offset from the distinct associated process air outlet.

10. The air dryer as defined in claim 9 wherein for every rotary setting of the plurality of rotary settings, at least one of the plurality of desiccant housings is in a reactivation phase.

11. The air dryer as defined in claim 4 wherein each of the plurality of desiccant housings includes an associated heater between the associated desiccant bed and the dry air end such that reactivation air is heated by the heater prior to reaching the associated desiccant bed and process air is heated by the heater after being dehumidified by the associated desiccant bed.

12. The air dryer as defined in claim 11 wherein the automatic valve actuator
   (a) monitors one of
      (i) the temperature of at least one of the plurality of desiccant beds,
      (ii) the relative humidity of at least one of the plurality of desiccant beds, and
      (iii) the time elapsed since the valve was last actuated to change the rotary setting of the rotary shaft; and,
   (b) actuates the valve to change the rotary setting of the rotary shaft upon the occurrence of either of the following specified dehumidification condition (i) and reactivation condition (ii),
      (i) the dehumidification condition occurs when at least one desiccant bed in the dehumidification phase is substantially unable to continue dehumidifying process air, and
      (ii) the reactivation condition occurs when at least one desiccant bed in the reactivation phase is substantially reactivated.

13. The air dryer as defined in claim 11 wherein
   (a) each of the plurality of desiccant housings includes an associated heat exchanger for cooling the associated desiccant bed, and an associated coolant conduit for piping cooling air from the reactivation inlet chamber to the associated heat exchanger, and from the associated heat exchanger to the reactivation outlet chamber;
   (b) the dry air end valve plate is configured relative to each of the plurality of desiccant housings and the associated cooling conduits such that
      (i) for each of the plurality of desiccant housings in the reactivation phase, the dry air end valve plate blocks the associated coolant conduit such that cooling air from the reactivation inlet chamber is isolated from to the associated heat exchanger, (ii) for each of the plurality of desiccant housings in the dehumidification phase, the dry air end valve plate leaves unblocked the associated coolant conduit such that cooling air from the reactivation inlet chamber is piped to the associated heat exchanger to cool the associated desiccant bed during the dehumidification phase;

(c) the humid air end valve plate is configured relative to each of the plurality of desiccant housings and the associated cooling conduits, and is oriented relative to the dry end valve plate such that for each of the plurality of desiccant housings (i) the humid air end valve plate blocks the associated cooling conduit when the dry air end valve plate blocks the associated cooling conduit, and (ii) the humid air end valve plate leaves the associated cooling conduit unblocked when the dry air end valve plate leaves the associated cooling conduit unblocked;

such that for each of the plurality of desiccant housings in the dehumidification phase, the reactivation blower draws cooling air into the associated heat exchanger via the associated coolant conduit and the reactivation inlet chamber, so as to cool the associated desiccant bed, and then exhausts the cooling air via the associated cooling conduit and the reactivation outlet chamber.

14. The air dryer as defined in claim 13 wherein (a) the air dryer is substantially cylindrical;

(b) the longitudinal axis of the rotary shaft is substantially centered in the circular cross-section of the cylindrical air dryer; and (c) both the humid air end valve plate and the dry air end valve plate are substantially circular.

15. The air dryer as defined in claim 13 wherein the plurality of desiccant housings comprise two desiccant housings each alternating between dehumidification and reactivation phases of operation, each of the two desiccant housings being in the dehumidification phase when the other of the two desiccant housings is in the reactivation phase.

16. The air dryer as defined in claim 11 wherein for each of the plurality of desiccant housing, the associated heater is powered during the reactivation phase of the associated desiccant bed, and is not powered during the process phase of such desiccant bed; the associated heater for each of the plurality of desiccant beds retaining some residual heat in the dehumidification phase from being powered in the reactivation phase such that the process air is heated by the residual heat in the associated heater after being dehumidified by the associated desiccant bed.

17. The air dryer as defined in claim 1 wherein (a) the external reactivation air inlet receives airflow from the process outlet chamber, such that reactivation airflow is taken from the dehumidified process airflow; and (b) some of the process airflow received by the external process air inlet is from outside the space to be dehumidified;

such that reactivation provided by the reactivation airflow is enhance due to the reactivation airflow being taken from the process outlet chamber, and, consequently, being dry.

18. The air dryer as defined in claim 1 wherein (a) the external reactivation air inlet receives airflow from outside the space to be dehumidified; and (b) all of the process airflow received by the external process air inlet is from the space to be dehumidified;

such that leakage of process air to outside the space to be dehumidified is minimized.

19. An air dryer including a plurality of separate desiccant beds arranged in parallel between a humid air end and a dry air end, each of the plurality of desiccant beds alternately receiving process air and heated reactivation air such that each of the plurality of separate desiccant beds alternately dehumidifies process air during a dehumidification phase of such desiccant bed and is reactivated by heated reactivation air during a reactivation phase of such desiccant bed, the air dryer comprising at the humid air end distal to a humid air end wall from the plurality of desiccant beds (a) a process inlet chamber having an external process air inlet for receiving process air from an air space to be dehumidified, and a plurality of internal process air inlets in the humid air end wall downwind from the process inlet chamber and the external process air inlet, each of the plurality of internal process air inlets being for airflow communication with a distinct one of the plurality of separate desiccant beds;

(b) a reactivation outlet chamber having an external reactivation air outlet for releasing humidified reactivation air outside of the air space to be reactivated, and a plurality of internal reactivation air outlets in the humid air end wall upwind from the reactivation outlet chamber and the external reactivation air outlet, each of the plurality of internal reactivation air outlets being for airflow communication with a distinct one of the plurality of separate desiccant beds;

at the dry air end distal to a dry air end wall from the plurality of desiccant beds, (c) a reactivation inlet chamber having an external reactivation air inlet for receiving reactivation air, and a plurality of internal reactivation air inlets in the dry air end wall downwind from the reactivation inlet chamber and the external reactivation air inlet, each of the plurality of internal reactivation air inlets being for airflow communication with a distinct one of the plurality of separate desiccant beds;

(d) a process outlet chamber having an external process air outlet for releasing dehumidified process air into the air space to be dehumidified, and a plurality of internal process air outlets in the dry air end wall upwind of the process outlet chamber and the external process air outlet, each of the plurality of internal process air outlets being for airflow communication with a distinct one of the plurality of separate desiccant beds;

(e) a plurality of desiccant housings, each of the plurality of desiccant beds being contained in a distinct one of the plurality of desiccant housings, each of the plurality of desiccant housings being isolated from air flows within other desiccant housings of the plurality of desiccant housings, and adjacent to (i) the process inlet chamber at the humid air end wall, (ii) the process outlet chamber at the dry air end wall, (iii) the reactivation inlet chamber at the dry air end wall, (iv) the reactivation outlet chamber at the humid air end wall, such that for each desiccant housing of the plurality of desiccant housings, (v) the plurality of internal process air inlets includes a distinct associated process air inlet permitting direct airflow communication, when open, from the process air inlet chamber to such desiccant housing, (vi) the plurality of internal process air outlets includes a distinct associated process air outlet, permitting direct airflow communication, when open, from such desiccant housing to the process air outlet chamber, (vii) the plurality of internal reactivation air inlets includes a distinct associated reactivation air inlet, permitting direct airflow communication, when open, from the reactivation air inlet chamber to such desiccant housing, and (viii) the plurality of internal reactivation air outlets includes a distinct associated reactivation air outlet, permitting direct airflow communication, when open, from such desiccant housing to the process air outlet chamber, each of the plurality of desiccant housings having a distinct associated one of the plurality of desiccant beds, the distinct associated desiccant bed being located, with respect to both the reactivation air flow and the process air flow, between (ix) the distinct associated process air inlet and the distinct associated process air outlet, and (x) the distinct associated reactivation inlet and the distinct associated reactivation air outlet;

(f) a rotary valve for alternating process air and reactivation air between each of the plurality of desiccant housings, the rotary valve including (i) a rotary shaft extending longitudinally between the humid air end and the dry air end, and being rotatable about a longitudinal axis of rotation to any one of a plurality of rotary settings, and (ii) a humid air end valve plate mounted on the rotary shaft at the humid air end and configured relative to the plurality of internal process air inlets and the plurality of internal reactivation air outlets such that for each of the plurality of desiccant housings, the plurality of rotary settings includes an associated dehumidification setting wherein the humid air end valve plate covers and thereby closes the distinct associated reactivation air outlet and the humid air end valve plate leaves the distinct associated process air inlet uncovered and open, for each of the plurality of desiccant housings, the plurality of rotary settings includes an associated reactivation setting wherein the humid air end valve plate covers and thereby closes the distinct associated process air inlet and the humid air end valve plate leaves the distinct associated reactivation air outlet uncovered and open, (iii) a dry air end valve plate configured relative to the plurality of internal process air outlets and the plurality of internal reactivation air inlets and mounted and oriented on the rotary shaft at the dry air end relative to the humid air end valve plate such that, for each of the plurality of desiccant housings and for each of the plurality of rotary settings, the dry air end plate covers the distinct associated process air outlet when the humid air end plate covers the distinct associated process air inlet, and covers the distinct associated reactivation air inlet when the humid air end plate covers the distinct associated reactivation air outlet, and (v) for each setting, there is at least one desiccant housing wherein the associated process inlet and the associated process outlet are open, and the associated reactivation inlet and the associated reactivation outlet are closed so that continuous dehumidification of process air is provided;

(g) an automatic valve actuator for automatically actuating the rotary valve to periodically alternate process air and reactivation air between each of the plurality of desiccant housings; and, (h) a blower means for drawing reactivation air flow through each of the plurality of desiccant housings during the reactivation phase thereof, and for drawing process air flow through each of the plurality of desiccant housings during the dehumidification phase thereof.

20. The air dryer as defined in claim 19 wherein for each of the plurality of desiccant housings and for each of the plurality of rotary settings, the humid air end valve plate covers and thereby closes one of the distinct associated process air inlet and the distinct associated reactivation air outlet while the other of the distinct associated process air inlet and the distinct associated reactivation air outlet is uncovered and open, such that for each rotary setting, each desiccant housing is in one of the dehumidification phase and reactivation phase.

21. The air dryer as defined in claim 19 further comprising a support structure for mutually attaching the plurality of desiccant housings, the process inlet chamber, the process outlet chamber, the reactivation inlet chamber, the reactivation outlet chamber, the blower means and the valve as a single integral unit.

22. In an air dryer including a desiccant component, the desiccant component alternately receiving and drying a process airflow during a dehumidification phase, and receiving and being reactivated by a heated reactivation airflow during a reactivation phase, (a) a process intake wall having a process air intake for receiving process air from an air space to be dehumidified, the process intake wall and the process air intake being upwind from the desiccant component with respect to the process airflow, the process air intake permitting the process airflow to communicate with the desiccant component during the dehumidification phase;

(b) a reactivation output wall having a reactivation air outport for releasing the humidified reactivation airflow outside of the air space to be dehumidified, the reactivation air outport and the reactivation output wall being downwind from the desiccant component with respect to the reactivation airflow, the reactivation air outport being in airflow communication with the desiccant component during the reactivation phase;

(c) a reactivation intake wall having a reactivation air intake for receiving the reactivation airflow, the reactivation intake wall and the reactivation air intake being upwind from the desiccant component with respect to the reactivation airflow, the reactivation air intake being for airflow communication with the desiccant component during the reactivation phase;

(d) a process output wall having a process air outport for releasing dehumidified process air into the air space to be dehumidified, the process output wall and the process air outport being downwind of the desiccant component with respect to the process airflow;

(e) a desiccant casing for containing the desiccant component, the desiccant casing being adjacent to (i) the process intake wall such that the process intake permits airflow communication from the air space to be dehumidified into the desiccant casing during the dehumidification phase, (ii) the process output wall such that the process outport permits airflow communication from the desiccant casing to the air space to be dehumidified during the dehumidification phase, (iii) the reactivation intake wall such that the reactivation intake permits the reactivation airflow into the desiccant casing during the reactivation phase, (iv) the reactivation output wall such that the reactivation outport receives and releases the reactivation airflow from the desiccant casing during the reactivation phase;

(f) valve means for alternating process air and reactivation air through the desiccant casing by, before the dehumidification phase, synchronously opening the process intake and the process output, while closing the reactivation intake and the reactivation output, and before the reactivation phase, synchronously opening the reactivation intake and the reactivation output, while closing the process intake and the process output;

(g) an automatic valve actuator for automatically actuating the valve means to periodically alternate process air and reactivation air through the desiccant casing;

(h) conduit means having sealing means for
  (i) when the reactivation air intake is inside the air space to be dehumidified, sealingly attaching the conduit means to the reactivation intake wall about the reactivation air intake to permit airflow communication between the outside space and the reactivation air intake, while isolating the reactivation airflow from the air space to be dehumidified,
  (ii) when the reactivation air outport is inside the air space to be dehumidified, sealingly attaching the conduit means to the reactivation output wall about the reactivation air outport to permit airflow communication between the outside space and the reactivation air outport, while isolating the reactivation airflow from the air space to be dehumidified,
  (iii) when the process air intake is outside the air space to be dehumidified, sealingly attaching the conduit means to the process intake wall about the process air intake to permit airflow communication between the air space to be dehumidified and the process air intake, isolating the process airflow from the outside space,
  (vi) when the process air outport is outside the air space to be dehumidified, sealingly attaching the conduit means to the process output wall about the process air outport to permit airflow communication between the air space to be dehumidified and the process air outport, while isolating the process airflow from the outside space; and, (i) a blower means for generating reactivation air flow through the desiccant casing during the reactivation phase thereof, and for generating process air flow through the desiccant casing during the dehumidification phase.

23. The air dryer as defined in claim 22 wherein (a) the desiccant component comprises a plurality of separate desiccant beds, each of the plurality of desiccant beds alternately receiving process air and heated reactivation air such that each of the plurality of separate desiccant beds alternately dries process air during a dehumidification phase of such desiccant bed and is reactivated by heated reactivation air during a reactivation phase of such desiccant bed;

(b) the reactivation outport comprises a plurality of reactivation outlets for releasing humidified reactivation air outside of the air space to be dehumidified, the plurality of reactivation air outlets and the reactivation outlet wall being downwind with respect to the reactivation airflow from the plurality of desiccant beds, each of the plurality of reactivation air outlets being for airflow communication with a distinct one of the plurality of separate desiccant beds;

(c) the process intake comprises a plurality of process inlets, for receiving process air from the air space to be dehumidified, the plurality of process air inlets and the process inlet wall being upwind with respect to the process airflow from the plurality of separate desiccant beds, each of the plurality of internal process air inlets being for airflow communication with a distinct one of the plurality of separate desiccant beds;

(d) the process outport comprises a plurality of process outlets for releasing dehumidified process air into the air space to be dehumidified, the plurality of process air outlets and the process outlet wall being downwind of the plurality of separate desiccant beds with respect to the process airflow, each of the plurality of internal process air outlets being for airflow communication with a distinct one of the plurality of separate desiccant beds;

(e) the reactivation intake comprises a plurality of reactivation inlets, the plurality of reactivation air inlets and the reactivation inlet wall being upwind from the plurality of separate desiccant beds, each of the plurality of reactivation air inlets being for airflow communication with a distinct one of the plurality of separate desiccant beds;

(f) the desiccant casing comprises a plurality of desiccant housings, each of the plurality of desiccant beds being contained in a distinct one of the plurality of desiccant housings, the plurality of desiccant housings being mutually isolated such that the airflow through each desiccant housing in the plurality of desiccant housings is isolated from airflow paths through the other desiccant housings in the plurality of desiccant housings, each desiccant housing in the plurality of desiccant housings being adjacent to
  (i) the process intake wall,
  (ii) the process output wall,
  (iii) the reactivation intake wall,
  (iv) the reactivation outport wall,
  such that for each desiccant housing of the plurality of desiccant housings,
  (v) the plurality of process air inlets includes a distinct associated process air inlet permitting direct airflow communication, when open, from the air space to be dehumidified to such desiccant housing,
  (vi) the plurality of process air outlets includes a distinct associated process air outlet, permitting direct airflow communication, when open, from such desiccant housing to the air space to be dehumidified,
  (vii) the plurality of reactivation air inlets includes a distinct associated reactivation air inlet, permitting direct airflow communication, when open, from the outside airspace to such desiccant housing, and
  (viii) the plurality of reactivation air outlets includes a distinct associated reactivation air outlet, permitting direct airflow communication, when open, from such desiccant housing to the outside airspace, each of the plurality of desiccant housings having a distinct associated one of the plurality of desiccant beds, the distinct associated desiccant bed being located, with respect to both the reactivation air flow and the process air flow, between
- (ix) the distinct associated process air inlet and the distinct associated process air outlet, and
- (x) the distinct associated reactivation inlet and the distinct associated reactivation air outlet;

(g) the valve means alternates process air and reactivation air between each of the plurality of desiccant housings by synchronously opening and closing each of the plurality of process inlets, each of the plurality of process outlets, each of the plurality of reactivation inlets and each of the plurality of reactivation outlets, such that for each desiccant housing
- (i) there is an associated dehumidification setting wherein the associated process inlet and the associated process outlet are open, and the associated reactivation inlet and the associated reactivation outlet are closed,
- (ii) there is an associated reactivation setting wherein the associated reactivation inlet and the associated reactivation outlet are open, and the associated process inlet and the associated process outlet are closed, and for each setting, there is at least one desiccant housing wherein the associated process inlet and the associated process outlet are open, and the associated reactivation inlet and the associated reactivation outlet are closed, so that continuous drying of process air is provided;

(h) the automatic valve actuator automatically actuates the valve means to periodically alternate process air and reactivation air between each of the plurality of desiccant housings; and,
- (i) the blower means generates reactivation air flow through each of the plurality of desiccant housings during the reactivation phase thereof, and generates process air flow through each of the plurality of desiccant housings during the dehumidification phase thereof.

24. The air dryer as defined in claim 23 wherein the reactivation intake and the reactivation outport are isolated from the air space to be dehumidified, impeding airflow communication between
- (a) the reactivation intake and the air space to be dehumidified;
- (b) the reactivation outport and the air space to be dehumidified.

* * * * *